(12) United States Patent
Koito et al.

(10) Patent No.: US 11,880,109 B2
(45) Date of Patent: Jan. 23, 2024

(54) LIGHT CONTROL DEVICE AND ILLUMINATION DEVICE

(71) Applicant: Japan Display Inc., Tokyo (JP)

(72) Inventors: Takeo Koito, Tokyo (JP); Tae Kurokawa, Tokyo (JP); Masashi Mitsui, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/881,610

(22) Filed: Aug. 5, 2022

(65) Prior Publication Data

US 2022/0373831 A1   Nov. 24, 2022

Related U.S. Application Data

(63) Continuation of application No. PCT/JP2020/047432, filed on Dec. 18, 2020.

(30) Foreign Application Priority Data

Feb. 7, 2020   (JP) ................................ 2020-019706

(51) Int. Cl.
*G02F 1/1347*   (2006.01)
*G02F 1/137*   (2006.01)
(Continued)

(52) U.S. Cl.
CPC ........ *G02F 1/1347* (2013.01); *G02F 1/13362* (2013.01); *G02F 1/13756* (2021.01);
(Continued)

(58) Field of Classification Search
CPC ............... G02F 1/1347; G02F 1/13471; G02F 1/134309; G02F 1/13756; G02F 1/29; G02F 1/294
See application file for complete search history.

(56) References Cited

U.S. PATENT DOCUMENTS

| | | | |
|---|---|---|---|
| 2010/0149444 A1 | 6/2010 | Hikmet et al. | |
| 2013/0235288 A1* | 9/2013 | Takama | G02F 1/1343 349/200 |

(Continued)

FOREIGN PATENT DOCUMENTS

| | | | | |
|---|---|---|---|---|
| CN | 103278992 A | * | 9/2013 | ......... G02B 27/2214 |
| CN | 103309117 A | | 9/2013 | |

(Continued)

OTHER PUBLICATIONS

International Search Report and Written Opinion dated Mar. 9, 2021, received for PCT Application PCT/JP2020/047432, filed on Dec. 18, 2020, 11 pages including English Translation.

(Continued)

*Primary Examiner* — Jessica M Merlin
(74) *Attorney, Agent, or Firm* — XSENSUS LLP

(57) ABSTRACT

According to one embodiment, a light control device includes a first liquid crystal cell, a second liquid crystal cell, and a polarization conversion element disposed between the first liquid crystal cell and the second liquid crystal cell. One substrate of each of the first liquid crystal cell and the second liquid crystal cell includes an insulating substrate, and first to fourth electrodes arranged on the insulating substrate and formed in a strip shape. The electric potential difference between the first electrode and the second electrode, the electric potential difference between the second electrode and the third electrode, and the electric potential difference between the third electrode and the fourth electrode are different from each other.

10 Claims, 19 Drawing Sheets

(51) Int. Cl.
*G02F 1/1335* (2006.01)
*G02F 1/13357* (2006.01)
*G02F 1/1343* (2006.01)
*G02F 1/29* (2006.01)

(52) U.S. Cl.
CPC .. *G02F 1/133528* (2013.01); *G02F 1/134309* (2013.01); *G02F 1/29* (2013.01)

(56) References Cited

U.S. PATENT DOCUMENTS

| | | |
|---|---|---|
| 2015/0077669 A1 | 3/2015 | Wu |
| 2018/0196318 A1 | 7/2018 | Presniakov et al. |
| 2019/0025657 A1 | 1/2019 | Presniakov et al. |

FOREIGN PATENT DOCUMENTS

| | | |
|---|---|---|
| CN | 103472651 A | 12/2013 |
| CN | 107367882 A | 11/2017 |
| CN | 108139590 A | 6/2018 |
| JP | 61-138922 A | 6/1986 |
| JP | 2010-525388 A | 7/2010 |
| JP | 2010-230887 A | 10/2010 |
| JP | 2013-186324 A | 9/2013 |
| JP | 2019-86539 A | 6/2019 |

OTHER PUBLICATIONS

Chinese Office Action dated Aug. 10, 2023 in corresponding Chinese Patent Application No. 202080095751.X, 10 pages.

* cited by examiner

US 11,880,109 B2

LIGHT CONTROL DEVICE AND ILLUMINATION DEVICE

CROSS-REFERENCE TO RELATED APPLICATIONS

This application is a Continuation Applications of PCT Application No. PCT/JP2020/047432, filed Dec. 18, 2020 and based upon and claiming the benefit of priority from Japanese Patent Application No. 2020-019706, filed Feb. 7, 2020, the entire contents of all of which are incorporated herein by reference.

FIELD

Embodiments described herein relate generally to a light control device and an illumination device.

BACKGROUND

In recent years, a light control device using a liquid crystal cell has been proposed. Such a light control device mainly converges or diverges a polarization component. For example, a light control device comprising two liquid crystal cells stacked, modulating one of polarization components in one of the liquid crystal cells, and modulating the other polarization component in the other liquid crystal cell is disclosed. As another example, a technology of stacking a plurality of liquid crystal lenses, stacking and displacing a strip electrode of one of the liquid crystal lenses from a strip electrode of the other liquid crystal lens, and arranging the strip electrodes finely in a pseudo manner has been known.

A high accuracy is required for bonding a pair of substrates to each other in a configuration in which electrodes opposed to each other with a liquid crystal layer interposed therebetween are disposed.

DETAILED DESCRIPTION

Figure 1:
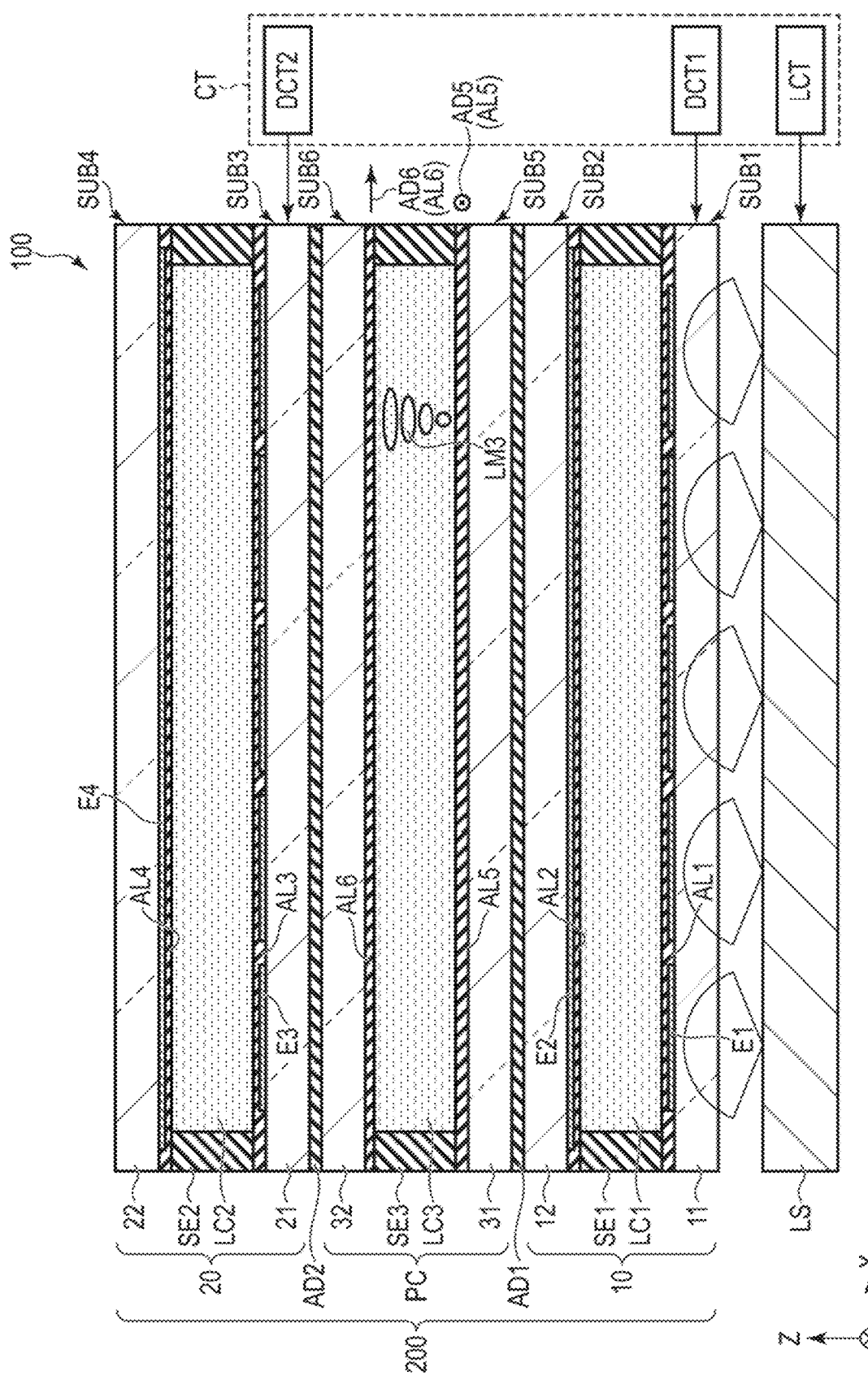
FIG. 1 is a view showing a configuration example of an illumination device 100 of embodiments.

In general, according to one embodiment, a light control device comprises, in a liquid crystal cell comprising a liquid crystal layer between a pair of substrates: an insulating substrate; and first to fourth electrodes arranged in order on the insulating substrate and formed in a strip shape. A potential difference between the first electrode and the second electrode, a potential difference between the second electrode and the third electrode, and a potential difference between the third electrode and the fourth electrode are different from each other.

According to another embodiment, a light control device comprises, in a liquid crystal cell comprising a liquid crystal layer between a pair of substrates: an insulating substrate; and first to fourth electrodes arranged in order on the insulating substrate and formed in a strip shape. An interval between the first electrode and the second electrode, an interval between the second electrode and the third electrode, and an interval between the third electrode and the fourth electrode are different from each other.

According to yet another embodiment, a light control device comprises: a first liquid crystal cell comprising a first liquid crystal layer between a pair of substrates; a second liquid crystal cell comprising a second liquid crystal layer between a pair of substrates; and a polarization conversion element disposed between the first liquid crystal cell and the second liquid crystal cell. One of substrates in each of the first liquid crystal cell and the second liquid crystal cell, comprising: an insulating substrate; and first to fourth electrodes arranged in order on the insulating substrate and formed in a strip shape. A potential difference between the first electrode and the second electrode, a potential difference between the second electrode and the third electrode, and a potential difference between the third electrode and the fourth electrode are different from each other. The first liquid crystal cell is configured to scatter a first polarization component having a polarization plane in a first direction, of incident light. The polarization conversion element is configured to convert a second polarization component having a polarization plane in a second direction intersecting the first direction, of light transmitting through the first liquid crystal cell, into the first polarization component. The second liquid crystal cell is configured to scatter the first polarization component, of the light transmitting through the polarization conversion element.

According to yet another embodiment, a light control device comprises: a first liquid crystal cell comprising a first liquid crystal layer between a pair of substrates; a second liquid crystal cell comprising a second liquid crystal layer between the pair of substrates; and a polarization conversion element disposed between the first liquid crystal cell and the second liquid crystal cell. One of substrates in each of the first liquid crystal cell and the second liquid crystal cell comprising: an insulating substrate; and first to fourth electrodes arranged in order on the insulating substrate and formed in a strip shape. An interval between the first electrode and the second electrode, an interval between the second electrode and the third electrode, and an interval between the third electrode and the fourth electrode are different from each other. The first liquid crystal cell is configured to scatter a first polarization component having a polarization plane in a first direction, of incident light. The polarization conversion element is configured to convert a second polarization component having a polarization plane in a second direction intersecting the first direction, of light transmitting through the first liquid crystal cell, into the first polarization component. The second liquid crystal cell is configured to scatter the first polarization component, of the light transmitting through the polarization conversion element.

According to an embodiment, an illumination device comprises: a light source; and one of the above light control devices configured to control light emitted from the light source.

According to an embodiment, a light control device and an illumination device capable of suppressing coloring can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a view showing a configuration example of an illumination device 100 of an embodiment. For example, a first direction X, a second direction Y, and a third direction Z are orthogonal to each other but may intersect at an angle other than 90 degrees. The first direction X and the second direction Y correspond to, for example, directions parallel to a substrate included in the illumination device 100, and the third direction Z corresponds to a thickness direction of the illumination device 100. In the embodiments, viewing an X-Y plane defined by the first direction X and the second direction Y is referred to as planar view.

The illumination device 100 comprises a light source LS, a light control device 200 configured to control light emitted from the light source LS, and a controller CT. The light source LS emits light in the third direction Z. The light emitted from the light source LS is, for example, non-polarized light (natural light). The light control device 200 overlaps the light source LS in the third direction Z. The light control device 200 comprises a first liquid crystal cell 10, a second liquid crystal cell 20, and a polarization conversion element PC. The first liquid crystal cell 10 and the second liquid crystal cell 20 include substantially the same components, but may include different components. The polarization conversion element PC is disposed between the first liquid crystal cell 10 and the second liquid crystal cell 20.

The first liquid crystal cell 10 comprises a first substrate SUB1, a second substrate SUB2, and a first liquid crystal layer LC1. The first substrate SUB1 comprises an insulating substrate 11, a plurality of first transparent electrodes E1 disposed on the insulating substrate 11, and a first alignment film AL1 that covers the first transparent electrodes E1. The light source LS is disposed to be opposed to the insulating substrate 11 in the third direction Z. The second substrate SUB2 comprises an insulating substrate 12, a second transparent electrode E2 disposed on the insulating substrate 12, and a second alignment film AL2 that covers the second transparent electrode E2. The second transparent electrode E2 is disposed to be opposed to the plurality of first transparent electrodes E1 in the third direction Z. The second transparent electrode E2 may be omitted. The first liquid crystal layer LC1 is held between the first substrate SUB1 and the seventh substrate SUB2, and is in contact with the first alignment film AL1 and the second alignment film AL2. The first liquid crystal layer LC1 is sealed by a sealant SE1.

The second liquid crystal cell 20 comprises a third substrate SUB3, a fourth substrate SUB4, and a second liquid crystal layer LC2. The third substrate SUB3 comprises an insulating substrate 21, a plurality of third transparent electrodes E3 disposed on the insulating substrate 21, and a third alignment film AL3 that covers the third transparent electrodes E3. The fourth substrate SUB4 comprises an insulating substrate 22, a fourth transparent electrode E4 disposed on the insulating substrate 22, and a fourth alignment film AL4 that covers the fourth transparent electrode E4. The fourth transparent electrode E4 is disposed to be opposed to the plurality of third transparent electrodes E3 in the third direction Z. The fourth transparent electrode E4 may be omitted. The second liquid crystal layer LC2 is held between the third substrate SUB3 and the fourth substrate SUB4 and is in contact with the third alignment film AL3 and the fourth alignment film AL4. The second liquid crystal layer LC2 is sealed by a sealant SE2. In the second liquid crystal cell 20, the third substrate SUB3 includes the same components as those of the first substrate SUB1, the fourth substrate SUB4 includes the same components as those of the second substrate SUB2, and the configuration of the second liquid crystal layer LC2 is the same as the configuration of the first liquid crystal layer LC1.

The polarization conversion element PC comprises a fifth substrate SUB5, a sixth substrate SUB6, and a third liquid crystal layer LC3. The fifth substrate SUB5 comprises an insulating substrate 31, and a fifth alignment film AL5 that covers the insulating substrate 31. The sixth substrate SUB6 comprises an insulating substrate 32 and a sixth alignment film AL6 that covers the insulating substrate 32. The third liquid crystal layer LC3 is held between the fifth substrate SUB5 and the sixth substrate SUB6 and is in contact with the fifth alignment film AL5 and the sixth alignment film AL6. The third liquid crystal layer LC3 is sealed by a sealant SE3. The fifth alignment film AL5 and the sixth alignment film AL6 are, for example, horizontal alignment films having an alignment restriction force substantially parallel to the X-Y plane and are subjected to alignment treatment in a predetermined direction. The alignment treatment may be a rubbing treatment or an optical alignment treatment. An alignment treatment direction of the fifth alignment film AL5 intersects an alignment treatment direction of the sixth alignment film AL6. The third liquid crystal layer LC3 contains liquid crystal molecules LM3 twist-aligned between the fifth alignment film AL5 and the sixth alignment film AL6. The polarization conversion element PC does not comprise an electrode. Therefore, an electric field is not formed in the third liquid crystal layer LC3, and the aligned state of the liquid crystal molecules LM3 is maintained by alignment restriction forces of the fifth alignment film AL5 and the sixth alignment film AL6.

The insulating substrates 11 and 12, the insulating substrates 21 and 22, and the insulating substrates 31 and 32 are, for example, transparent substrates such as glass substrates and resin substrates.

The first transparent electrodes E1, the second transparent electrode E2, and the third transparent electrodes E3, and the fourth transparent electrode E4 are formed of a transparent conductive material such as indium tin oxide (ITO) or indium zinc oxide (IZO).

The polarization conversion element PC overlaps the first liquid crystal cell 10 in the third direction Z. The insulating substrate 12 and the insulating substrate 31 are bonded to each other by a transparent adhesive layer AD1. A refractive index of the adhesive layer AD1 is equal to the refractive indexes of the insulating substrates 12 and 31.

The second liquid crystal cell 20 overlaps the polarization conversion element PC in the third direction Z. The insulating substrate 32 and the insulating substrate 21 are bonded to each other by a transparent adhesive layer AD2. A refractive index of the adhesive layer AD2 is equal to refractive indexes of the insulating substrates 32 and 21.

The controller CT comprises a light source controller LCT, and voltage controllers DCT1 and DCT2. The light source controller LCT controls, for example, a current value for driving the light source LS. The voltage controller DCT1 controls the voltage to be applied to the first liquid crystal layer LC1. The voltage controller DCT2 controls the voltage to be applied to the second liquid crystal layer LC2.

A role of the polarization conversion element PC will be described.

In the polarization conversion element PC, for example, an alignment treatment direction AD5 of the fifth alignment film AL5 is parallel to the second direction Y, and an alignment treatment direction AD6 of the sixth alignment film AL6 is parallel to the first direction X. In other words, the alignment treatment direction AD5 is orthogonal to the alignment treatment direction AD6. The liquid crystal molecules LM3 are twist-aligned between the fifth alignment film AL5 and the sixth alignment film AL6, by the alignment restriction force of the fifth alignment film AL5 and the sixth alignment film AL6. The polarization conversion element PC has an optical rotation ability to rotate a polarization plane of a polarization component (linearly polarized light) of the incident light at 90 degrees. For example, the polarization conversion element PC converts the first polarization component of the incident light into the second polarization component, and converts the second polarization component of the incident light into the first polarization component. The polarization plane of the first polarization component is orthogonal to the polarization plane of the second polarization component. When a traveling direction of light is along the third direction Z, the polarization component having the polarization plane along the first direction X is referred to as first polarized light (P-polarized light) POL1, and the polarization component having the polarization plane along the second direction Y is referred to as second polarized light (S-polarized light) POL2. For example, the first polarization component is the first polarized light POL1, and the second polarization component is the second polarized light POL2.

It has been described that the polarization conversion element PC is a twisted nematic liquid crystal element comprising no electrodes, but the polarization conversion element PC is not limited to this. In other words, the polarization conversion element PC may be the other element comprising a function of converting the first polarization component of the incident light into the second polarization component and converting the second polarization component of the incident light into the first polarization component.

Figure 2:
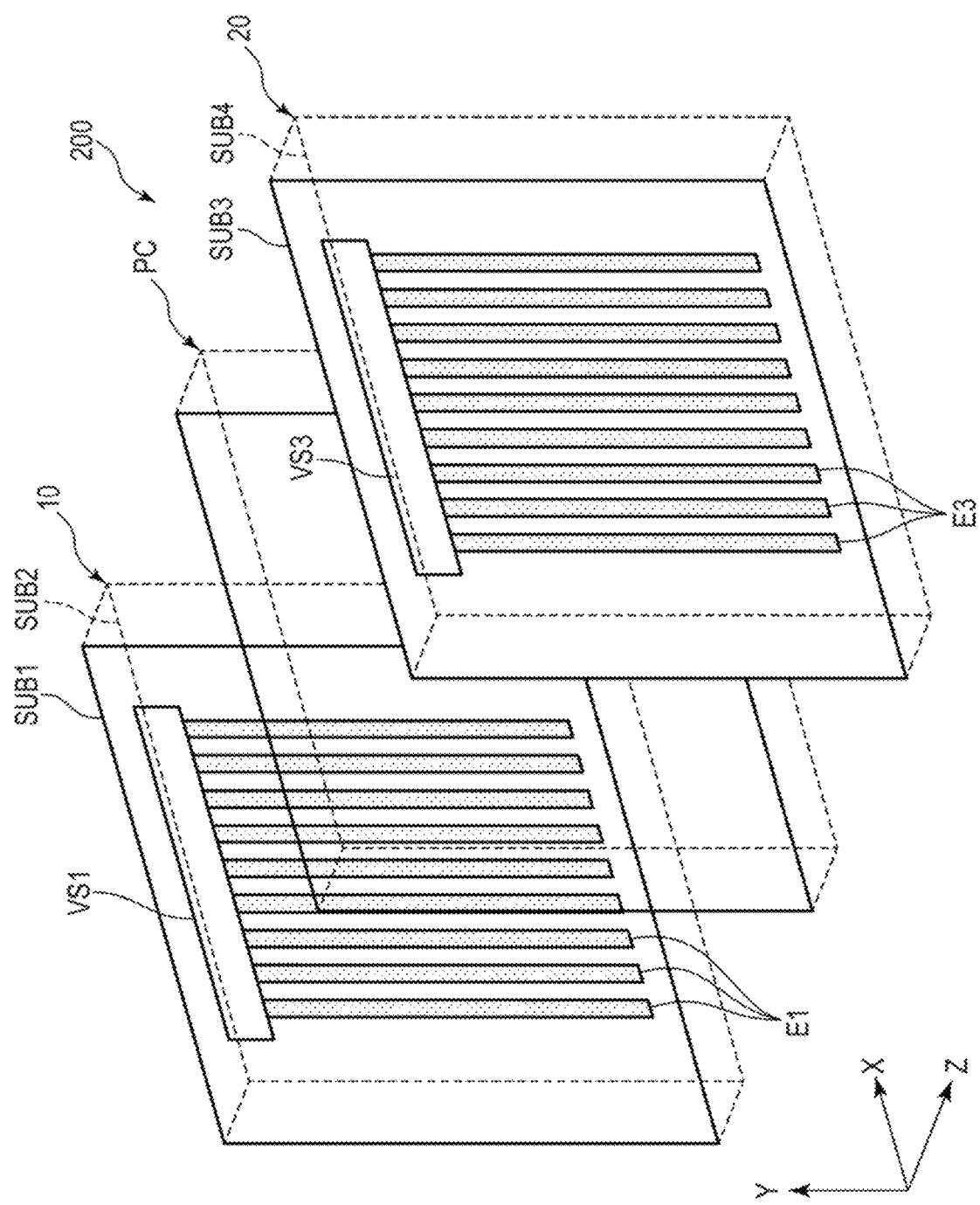
FIG. 2 is an exploded perspective view showing a configuration example of a light control device 200.

FIG. 2 is an exploded perspective view showing a configuration example of a light control device 200. In FIG. 2, only main parts are illustrated.

In the first liquid crystal cell 10, the first substrate SUB1 comprises a plurality of first transparent electrodes E1. The plurality of first transparent electrodes E1 are arranged in the first direction X. Each of the first transparent electrodes E1 extends in the second direction Y and is formed in a strip shape. In the second substrate SUB2 represented by a dotted line, the second transparent electrode is omitted. The plurality of first transparent electrodes E1 are electrically connected to a voltage supply unit VS1. Different voltages are supplied to adjacent first transparent electrodes of the plurality of first transparent electrodes E1.

In the second liquid crystal cell 20, the third substrate SUB3 comprises a plurality of third transparent electrodes E3. The plurality of third transparent electrodes E3 are arranged in the first direction X. Each of the third transparent electrodes E3 extends in the second direction Y and is formed in a strip shape. For example, the third transparent electrodes E3 overlap the first transparent electrodes E1 in the third direction Z. The third transparent electrodes E3 may be displaced from the first transparent electrodes E1 in the first direction X. In addition, the extending direction of the third transparent electrodes E3 may not be parallel to the extending direction of the first transparent electrodes E1. In the fourth substrate SUB4 represented by a dotted line, the fourth transparent electrode is omitted. The plurality of third transparent electrodes E3 are electrically connected to a voltage supply unit VS3.

Figure 3:
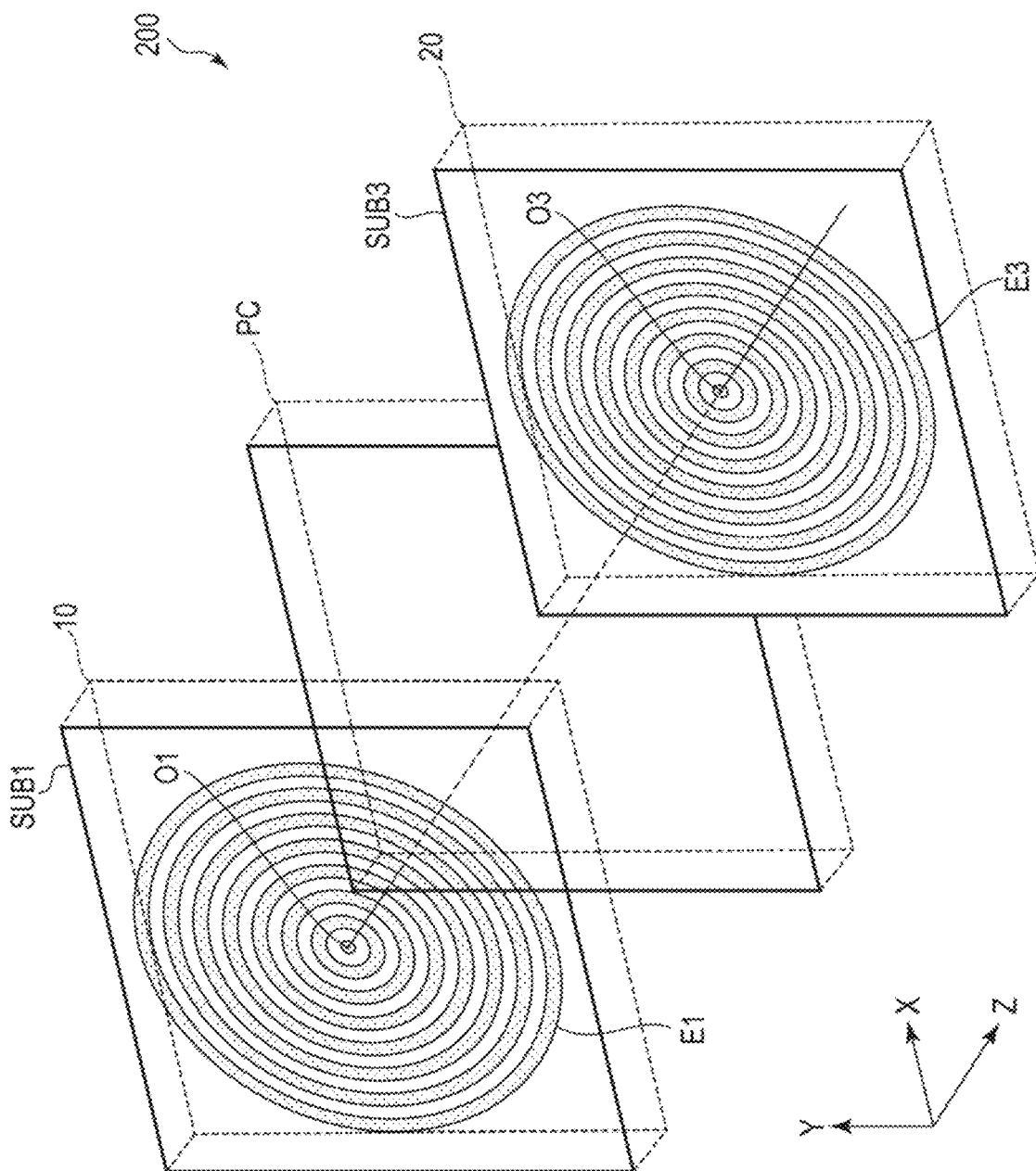
FIG. 3 is an exploded perspective view showing another configuration example of the light control device 200.

FIG. 3 is an exploded perspective view showing another configuration example of the light control device 200. In FIG. 3, only main parts are illustrated.

In the first liquid crystal cell 10, each of the plurality of first transparent electrodes E1 is formed in an annular strip shape. The plurality of first transparent electrodes E1 are disposed concentrically. In the second liquid crystal cell 20, each of the plurality of third transparent electrodes E3 is formed in an annular strip shape. The plurality of third transparent electrodes E3 are disposed concentrically. A center O1 of the first transparent electrodes E1 and a center O3 of the third transparent electrodes E3 overlap in planar view of the X-Y plane. In other words, the first transparent electrodes E1 and the third transparent electrodes E3 are formed such that their centers correspond to each other in the X-Y plane.

Figure 4:
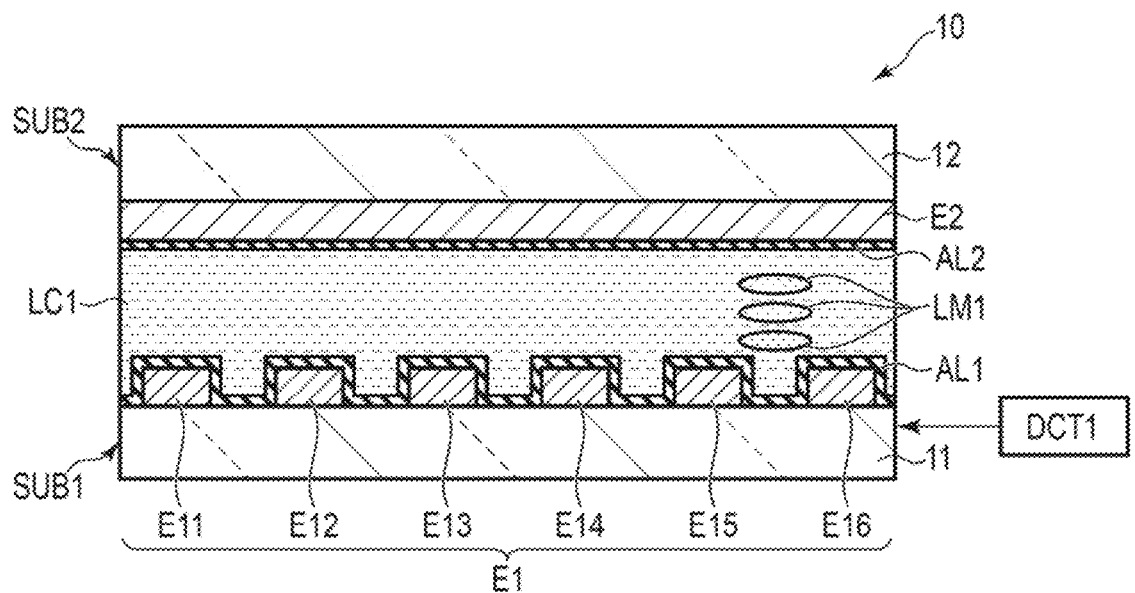
FIG. 4 is a cross-sectional view showing the first liquid crystal cell 10 shown in FIG. 1.

FIG. 4 is a cross-sectional view showing the first liquid crystal cell 10 shown in FIG. 1.

In the first substrate SUB1, the first transparent electrode E1 comprises a first electrode E11, a second electrode E12, a third electrode E13, a fourth electrode E14, a fifth electrode E15, and a sixth electrode E16, which are sequentially arranged on the insulating substrate 11. The voltage controller DCT1 applies individual voltages to the first electrode E11, the second electrode E12, the third electrode E13, the fourth electrode E14, the fifth electrode E15, and the sixth electrode E16, respectively.

The first alignment film AL1 and the second alignment film AL2 are, for example, horizontal alignment films and are subjected to alignment treatment in a predetermined direction. For example, the alignment treatment direction of the first alignment film AL1 is substantially parallel to the alignment treatment direction of the second alignment film AL2. The first liquid crystal layer LC1 contains liquid crystal molecules LM1 that is homogenically aligned (horizontally aligned) between the first alignment film AL1 and the second alignment film AL2. For example, the first liquid crystal layer LC1 is a positive type having a positive dielectric anisotropy, but may be a negative type having a negative dielectric anisotropy. The first alignment film AL1 and the second alignment film AL2 may be vertical alignment films. The alignment treatment direction of the first alignment film AL1 may intersect or be orthogonal to the alignment treatment direction of the second alignment film AL2. The first liquid crystal layer LC1 has a thickness of several tens of μm to several hundreds of μm and is thicker than the liquid crystal layer for the display device.

Although the cross-sectional structure of the first liquid crystal cell 10 has been described in FIG. 4, the second liquid crystal cell 20 also has the same cross-sectional structure as the first liquid crystal cell 10.

By the way, when the voltage controller DCT1 supplies a predetermined voltage to each of the first transparent electrode E1 and the second transparent electrode E2, an electric field is formed in the first liquid crystal layer LC1, and the liquid crystal molecules LM1 are aligned such that their long axes are set along the electric field.

The liquid crystal molecules LM1 have a refractive anisotropy Δn. For this reason, the on-state first liquid crystal layer LC1 in which the electric field is formed has a refractive index distribution according to the aligned state of the liquid crystal molecules LM1. Alternatively, the first liquid crystal layer LC1 has a retardation distribution represented by Δn·d, where d refers to the thickness of the first liquid crystal layer LC1 along the third direction Z. Such a refractive index distribution or a retardation distribution forms a liquid crystal lens. In other words, the liquid crystal lens described here corresponds to a refractive index distribution type lens formed in the first liquid crystal layer LC1. The first liquid crystal cell 10 in which the liquid crystal lens is formed generates an optical action of scattering the incident light by refracting (converging and diverging) the incident light. The degree of scattering (modulation rate) is controlled by the voltage applied to the first liquid crystal layer LC1. In other words, the modulation rate in the first liquid crystal cell 10 is controlled by the voltage controller DCT1.

The first liquid crystal cell 10 has been described, and the second liquid crystal cell 20 includes the same components as those of the first liquid crystal cell 10 as described above. For this reason, in the second liquid crystal cell 20, too, a liquid crystal lens similar to that in the first liquid crystal cell 10 can be formed in the on-state. The modulation rate in the second liquid crystal cell 20 is controlled by the voltage controller DCT2.

The optical action in the first liquid crystal cell 10 in a case where different voltages are supplied to adjacent electrodes of the first transparent electrodes E1 will be described. In the first liquid crystal layer LC1, a refractive index distribution is formed due to the electric field from the first transparent electrodes E1. For example, the first polarized light POL1 of the light incident on the first liquid crystal layer LC1 is scattered in a direction substantially orthogonal to the extending direction of the first transparent electrodes E1. When the first transparent electrodes E1 extend in the second direction Y as indicated in the configuration example shown in FIG. 2, the first polarized light POL1 is scattered in the first direction X. In addition, when the first transparent electrodes E1 are formed in an annular shape as indicated in the configuration example shown in FIG. 3, the first polarized light POL1 is scattered in almost all directions on the X-Y plane. The same optical action as that in the first liquid crystal cell 10 is realized in the second liquid crystal cell 20, too.

The description returns to FIG. 1 and the light emitted from the light source LS first becomes the incident light on the first liquid crystal cell 10. The first liquid crystal cell 10 scatters a part of the polarization component (for example, the first polarized light POL1) of the incident light. In addition, the first liquid crystal cell 10 hardly scatters but transmits the other polarization component (for example, the second polarized light POL2) of the incident light. The light transmitted through the first liquid crystal cell 10 becomes incident light on the polarization conversion element PC. The polarization plane of the incident light on the polarization conversion element PC is rotated at 90 degrees. In other words, the second polarized light POL2 that has transmitted through the first liquid crystal cell 10 is converted into the first polarized light POL1 in the polarization conversion element PC. The light transmitted through the polarization conversion element PC becomes the incident light on the second liquid crystal cell 20. The second liquid crystal cell 20 scatters the first polarized light POL1 converted by the polarization conversion element PC, of the incident light. Therefore, both the first polarization component and the second polarization component of the light emitted from the light source LS are scattered by the light control device 200.

The refractive index changes depending on the wavelength of light. For this reason, when white light is incident on the liquid crystal layer on which the refractive index distribution type lens is formed, the degree of scattering differs for each wavelength. In the light control device 200 of this embodiment, the white light emitted from the light source LS is scattered in each of the first liquid crystal layer LC1 of the first liquid crystal cell 10 and the second liquid crystal layer LC2 of the second liquid crystal cell 20. At this time, a part of the diffused white light may be colored due to the difference in the degree of scattering for each wavelength.

In this regard, the present inventors performed a simulation. In other words, assuming that a screen exists at a position 100 mm away from the optical control device 200, the present inventors calculated the light intensity of each of a red component (R), a green component (G), and a blue component (B) at each position along the first direction X with reference to a referential position on the screen.

Figure 5:
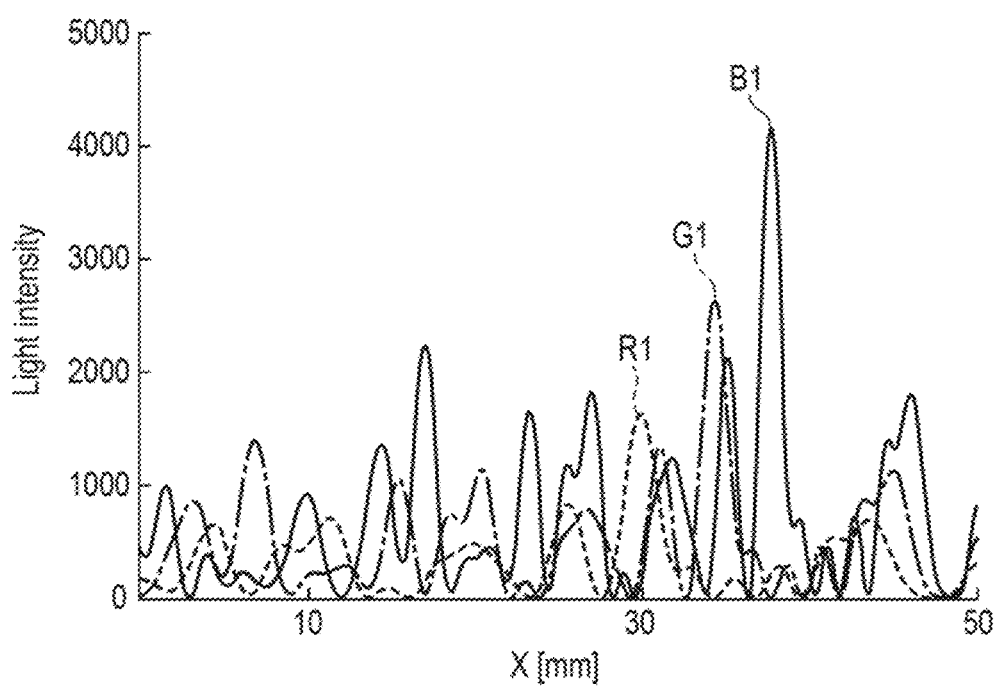
FIG. 5 is a graph showing simulation results.

FIG. 5 is a graph showing simulation results. A horizontal axis of the figure refers to a distance from the referential position, and a vertical axis of the figure refers to a light intensity. An applied voltage of the first electrode E11, the third electrode E13, and the fifth electrode E15 was set to +10V, an applied voltage of the second electrode E12, the fourth electrode E14, and the sixth electrode E16 was set to −10V, and an applied voltage of the second transparent electrode E2 was set to 0V as voltage conditions of simulation 1.

In the figure, R1 indicates the result of simulation 1 of the red component, G1 indicates the result of simulation 1 of the green component, and B1 indicates the result of simulation 1 of the blue component.

According to the results of simulation 1, the peak of the light intensity appeared at a position approximately 30 mm away from the referential position for the red component (R), the peak of the light intensity appeared at a position approximately 35 mm away from the referential position for the green component (G), and the peak of the light intensity appeared at a position approximately 38 mm away from the referential position for the blue component (B). In addition, it was confirmed that as the distance from the optical control device 200 further increased, the position of the peak for each color component deviated greatly from the referential position and the amount of deviation between the color components also increased.

Figure 6A:
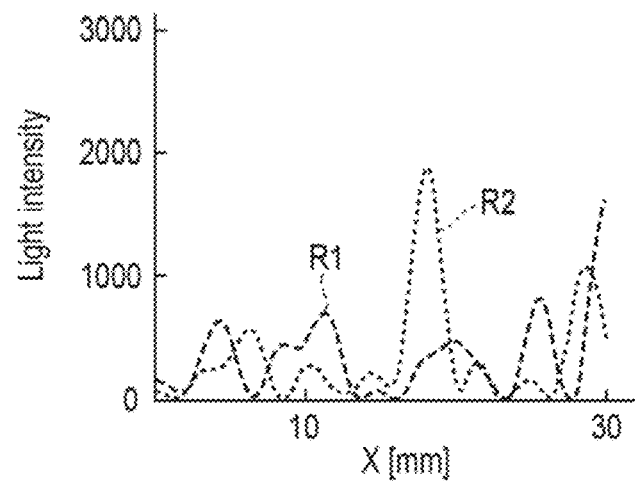
FIG. 6A is a graph showing a simulation result for each color component.
Figure 6B:
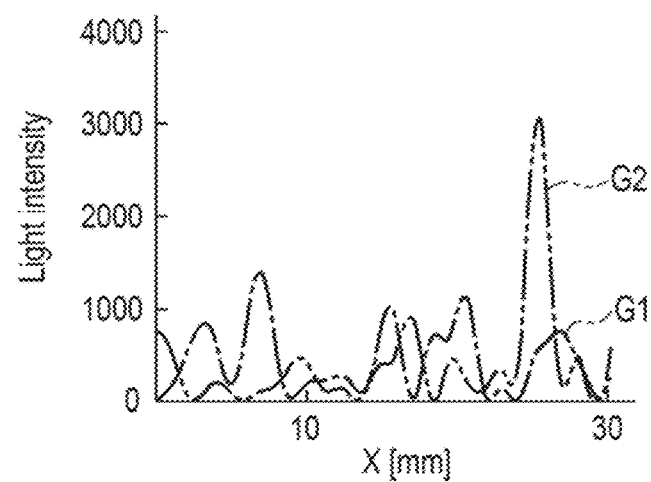
FIG. 6B is a graph showing a simulation result for each color component.
Figure 6C:
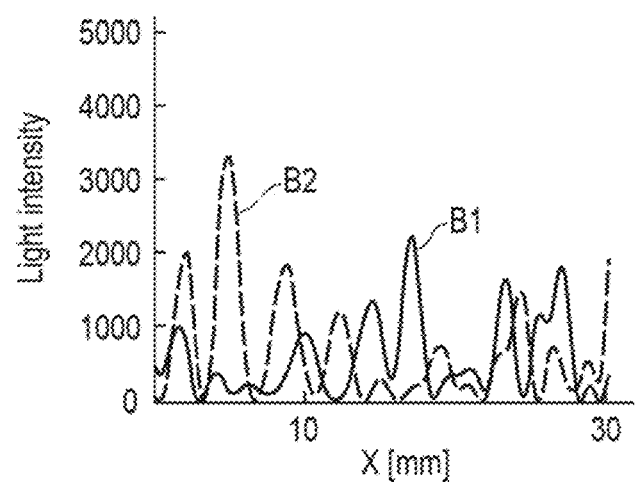
FIG. 6C is a graph showing a simulation result for each color component.

FIG. 6A to FIG. 6C are graphs showing simulation results for each color component. FIG. 6A shows the simulation result of the red component, FIG. 6B shows the simulation result of the green component, and FIG. 6C shows the simulation result of the blue component.

An applied voltage of the first electrode E11, the third electrode E13, and the fifth electrode E15 was set to +20V, an applied voltage of the second electrode E12, the fourth electrode E14, and the sixth electrode E16 was set to −20V, and an applied voltage of the second transparent electrode E2 was set to 0V as voltage conditions of simulation 2.

In the figure, R2 indicates the result of simulation 2 of the red component, G2 indicates the result of simulation 2 of the green component, and B2 indicates the result of simulation 2 of the blue component.

According to the results of simulations 1 and 2, it was confirmed that the position of the peak (or the maximum value) of the light intensity for each of the red component, the green component, and the blue component differs depending on the magnitude of the applied voltage. In other words, it was confirmed that the refractive index distribution of the liquid crystal layer can be changed and the position of the peak for each color component can be controlled by changing the applied voltage of each electrode. The example of controlling the refractive index distribution of the liquid crystal layer by the applied voltage of each electrode has been described, but the refractive index distribution of the liquid crystal layer can also be changed and the position of the peak can be controlled similarly to the above-described case by changing the interval between adjacent electrodes.

First Configuration Example

A first configuration example of this embodiment to be described below corresponds to an example of controlling the refractive index distribution of the liquid crystal layer by different potential differences between adjacent electrodes.

Figure 7:
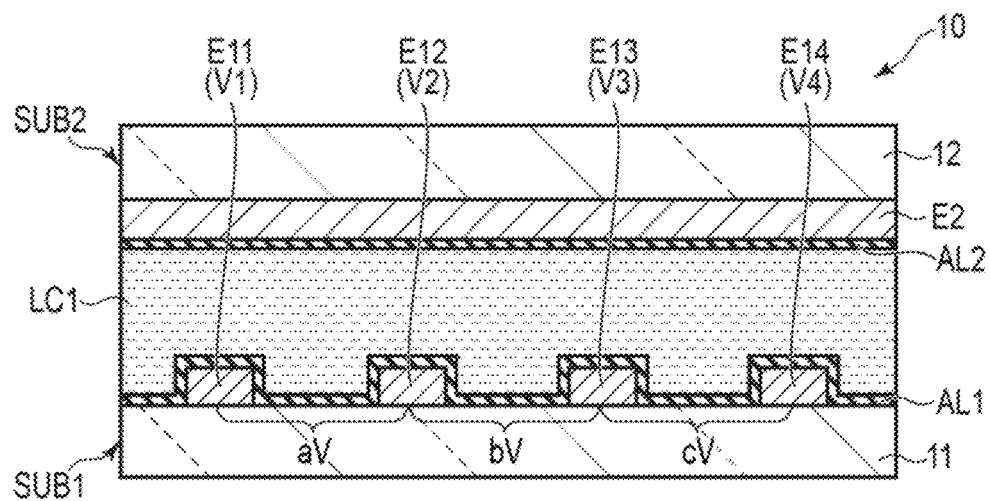
FIG. 7 is a cross-sectional view showing a first configuration example.

FIG. 7 is a cross-sectional view showing a first configuration example. The first electrode E11, the second electrode E12, the third electrode E13, and the fourth electrode E14 are configured such that individual voltages are applied to make the potential differences between the adjacent electrodes different. In other words, a potential difference aV between the first electrode E11 and the second electrode E12, a potential difference bV between the second electrode E12 and the third electrode E13, and a potential difference cV between the third electrode E13 and the fourth electrode E14 are different (a≠b≠c). The interval between the first electrode E11 and the second electrode E12, the interval between the second electrode E12 and the third electrode E13, and the interval between the third electrode E13 and the fourth electrode E14 are, for example, the same but may be different from each other.

An applied voltage V1 of the first electrode E11, an applied voltage V2 of the second electrode E12, an applied voltage V3 of the third electrode E13, and an applied voltage V4 of the fourth electrode E14 are desirably different from each other, but two of the applied voltages V1 to V4 may be the same. As a specific example, when the applied voltage V1 is 4V, the applied voltage V2 is 1V, the applied voltage V3 is 5V, and the applied voltage V4 is 3V, the potential difference between the first electrode E11 and the second electrode E12 is 3V, the potential difference between the second electrode E12 and the third electrode E13 is 4V, and the potential difference between the third electrode E13 and the fourth electrode E14 is 2V.

In addition, the applied voltages of the adjacent electrodes may have opposite polarities. For example, the applied voltage V1 of the first electrode E11 and the applied voltage V3 of the third electrode E13 are positive, and the applied voltage V2 of the second electrode E12 and the applied voltage V4 of the fourth electrode E14 are negative. As a specific example, when the applied voltage V1 is +4V, the applied voltage V2 is −1V, the applied voltage V3 is +5V, and the applied voltage V4 is −3V, a potential difference between the first electrode E11 and the second electrode E12 is 5V, a potential difference between the second electrode E12 and the third electrode E13 is 6V, and a potential difference between the third electrode E13 and the fourth electrode E14 is 8V. As a result, the potential difference between the adjacent electrodes can be increased without increasing an absolute value of the applied voltage.

In addition, the applied voltages of the adjacent electrodes may have opposite polarities, and the absolute values of the applied voltages of the adjacent electrodes may be the same. For example, the absolute values of the applied voltage V1 of the first electrode E11 and the applied voltage V2 of the second electrode E12 are the same, and the absolute values of the applied voltage V3 of the third electrode E13 and the applied voltage V4 of the fourth electrode E14 are the same. As a specific example, when the applied voltage V1 is +5V, the applied voltage V2 is −5V, the applied voltage V3 is +3V, and the applied voltage V4 is −3V, the potential difference between the first electrode E11 and the second electrode E12 is 10V, the potential difference between the second electrode E12 and the third electrode E13 is 8V, and the potential difference between the third electrode E13 and the fourth electrode E14 is 6V.

The applied voltages of the first liquid crystal cell 10 have been described, but the applied voltages of the second liquid crystal cell 20 may be set similarly.

As described above, the peak of the light intensity is less likely to appear at a specific position for each color component, and a broader beam profile can be realized, by making the potential differences between the adjacent electrodes different. Therefore, coloring is suppressed for white light obtained by mixing the color components.

Figure 8:
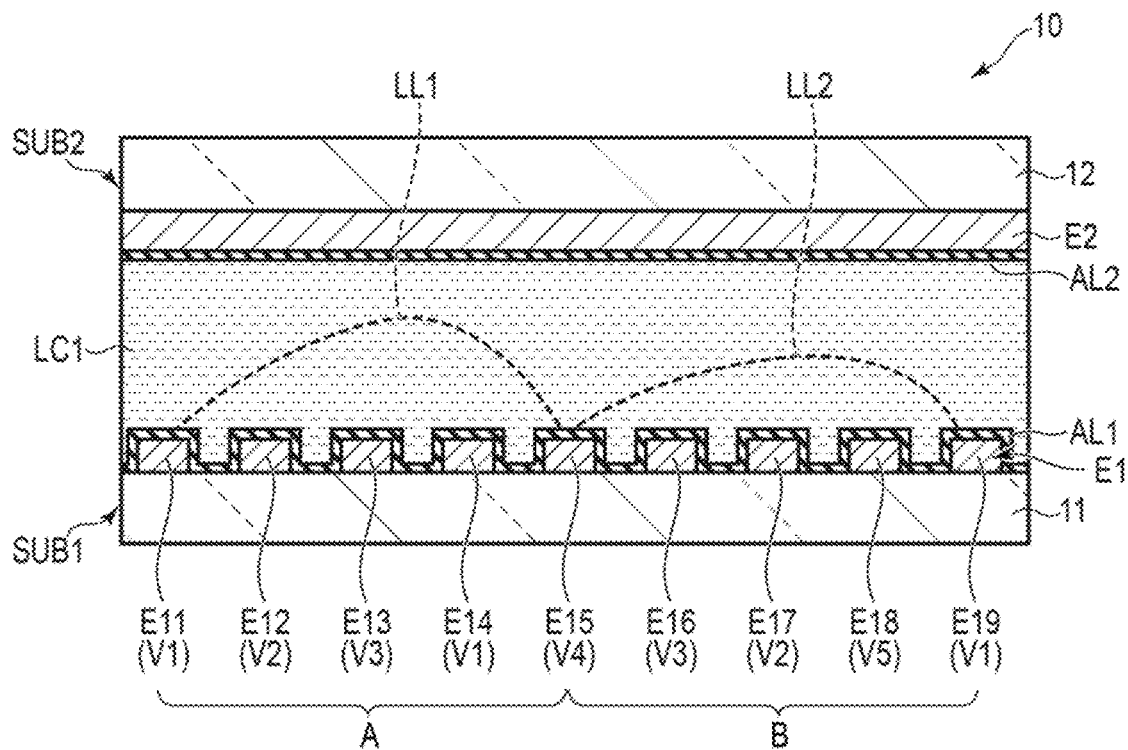
FIG. 8 is a cross-sectional view illustrating a variation of the first configuration example.

FIG. 8 is a cross-sectional view illustrating a variation of the first configuration example. The electrodes E11 to E19 constituting the first transparent electrode E1 are arranged in this order on the insulating substrate 11. The applied voltages of the nine electrodes E11 to E19 are set such that the potential differences between the adjacent electrodes are different. However, nine types of applied voltages do not need to be prepared for the nine electrodes E11 to E19 and, in the example shown in FIG. 8, five types of applied voltages V1 to V5 are prepared. The applied voltages of the electrodes E11, E14, and E19 are set to the same voltage V1, the applied voltages of the electrodes E12 and E17 are set to the same voltage V2, the applied voltages of the electrodes E13 and E16 are set to the same voltage V3, the applied voltage of the electrode E15 is set to the voltage V4, and the applied voltage of the electrode E18 is set to the voltage V5.

In such voltage settings, unit A is constituted by five electrodes E11 to E15, and unit B is constituted by five electrodes E15 to E19. In the first liquid crystal layer LC1, two types of liquid crystal lenses LL1 and LL2 are formed. The liquid crystal lens LL1 is formed by a first refractive index distribution according to the electric field of the unit A. The liquid crystal lens LL2 is formed by a second refractive index distribution according to the electric field of the unit B. The first refractive index distribution is different from the second refractive index distribution, and the degree of scattering by the liquid crystal lens LL1 is different from the degree of scattering by the liquid crystal lens LL2. A desired beam profile can be realized for each color component by combining a plurality of liquid crystal lenses having different degrees of scattering.

The case where the number of electrodes constituting the unit A is the same as the number of electrodes constituting the unit B has been described, but the number of electrodes in the unit A may be different from the number of electrodes in the unit B.

In addition, a unit C may be further added to form a liquid crystal lens LL3 having a different degree of scattering. In other words, three or more types of units may be combined as appropriate.

In addition, the order of arrangement of the plurality of units may not be regular particularly.

Each of the liquid crystal lenses LL1 and LL2 may be formed by a symmetric refractive index distribution or an asymmetrical refractive index distribution.

Figure 9:
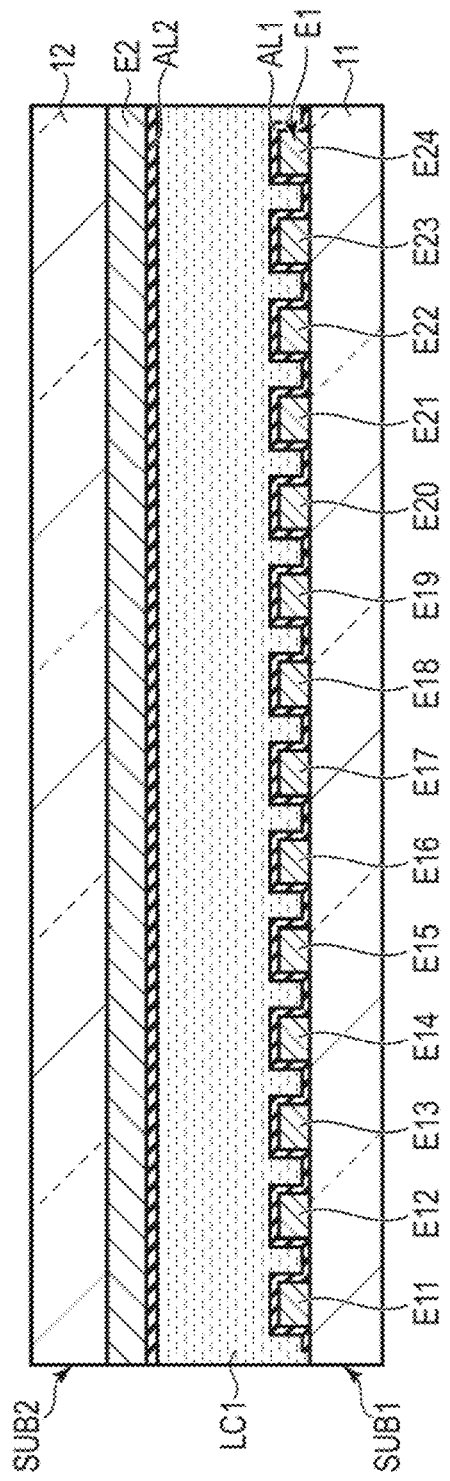
FIG. 9 is a cross-sectional view illustrating an embodiment.

FIG. 9 is a cross-sectional view illustrating an embodiment. The electrodes E11 to E24 constituting the first transparent electrode E1 are arranged in this order on the insulating substrate 11. The voltage conditions of this embodiment are as follows.

The applied voltage of the electrode E11 is +8V, and the applied voltage of the electrode E12 is −8V.

The applied voltage of the electrode E13 is +6V, and the applied voltage of the electrode E14 is −6V.

The applied voltage of the electrode E15 is +4V, and the applied voltage of the electrode E16 is −4V.

The applied voltage of the electrode E17 is +2V, and the applied voltage of the electrode E18 is −2V.

The applied voltage of the electrode E19 is +4V, and the applied voltage of the electrode E20 is −4V.

The applied voltage of the electrode E21 is +6V, and the applied voltage of the electrode E22 is −6V.

The applied voltage of the electrode E23 is +8V, and the applied voltage of the electrode E24 is −8V.

The voltage conditions of a comparative example are as follows.

The applied voltages of the electrodes E11, E13, E15, E17, E19, E21, and E23 are +5V.

The applied voltages of the electrodes E12, E14, E16, E18, E20, E22, and E24 is −5V.

The applied voltage of the second transparent electrode E2 is 0V in both the embodiment and the comparative example.

Figure 10:
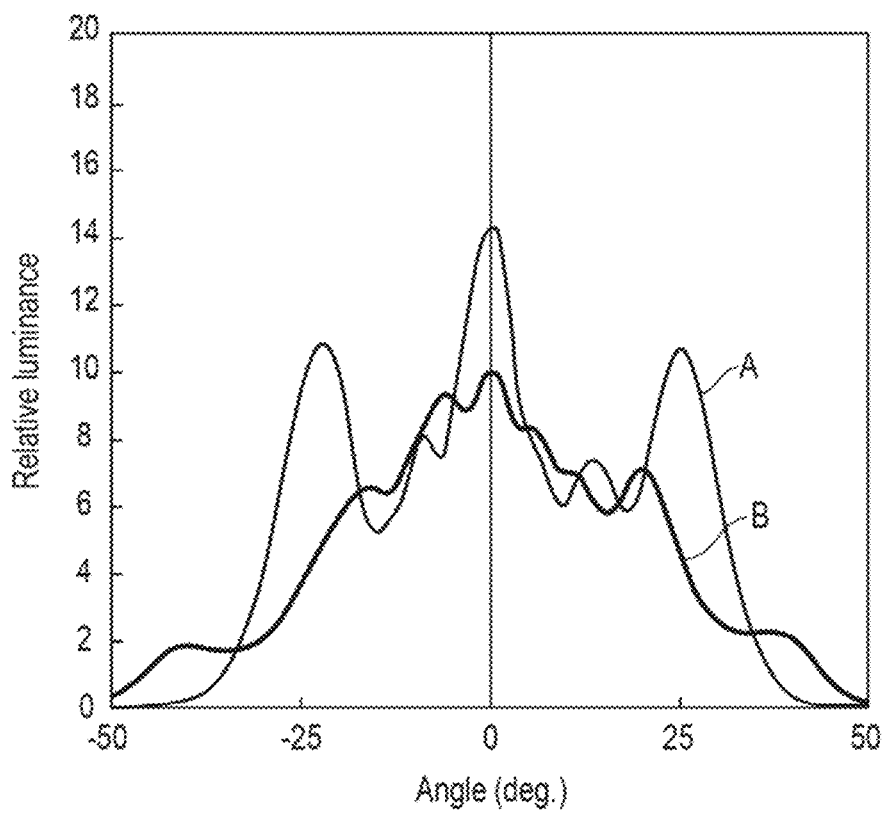
FIG. 10 is a graph showing a beam profile of white light.

FIG. 10 is a graph showing a beam profile of white light. A horizontal axis of the figure refers to a scattering angle with respect to the normal of the optical control device 200, and a vertical axis of the figure refers to a relative luminance. A in the figure indicates a beam profile of a comparative example, and B in the figure indicates a beam profile of this embodiment.

In the beam profile A of the comparative example, it was confirmed that a maximum value appeared in the vicinity of the scattering angle of 0 degrees and the scattering angle of ±25 degrees while the luminance rapidly decreased and a large difference in luminance occurred in the range of −25 degrees to 0 degrees and the range of 0 degrees to +25 degrees.

In the beam profile B of this embodiment, it was confirmed that a plurality of maximum values appeared but the luminance difference was relatively small.

Figure 11:
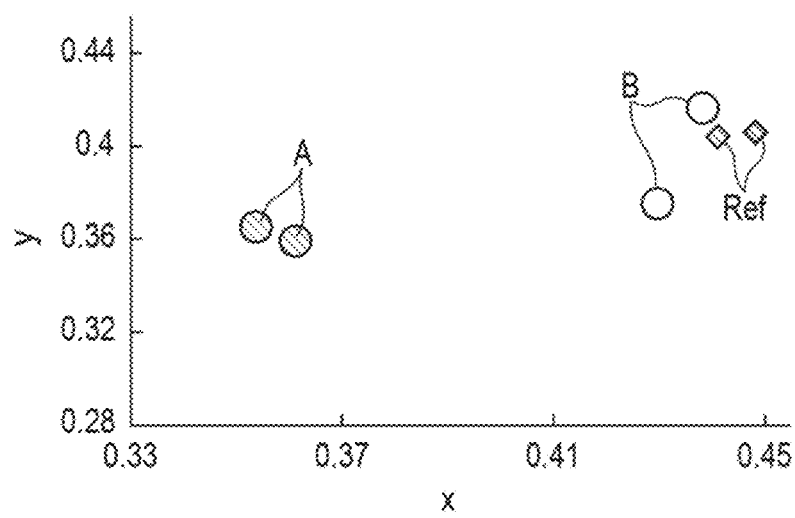
FIG. 11 is a graph showing the chromaticity of white light.

FIG. 11 is a graph showing the chromaticity of white light. The chromaticity is shown as coordinates on the xy chromaticity diagram. Ref in the figure indicates a referential chromaticity of the white light emitted from the light source LS, A in the figure indicates the chromaticity of the white light scattered by the light control device 200 of the comparative example, and B in the figure indicates the chromaticity of the white light scattered by the light control device 200 of this embodiment. Two chromaticities are shown for each of Ref, A, and B, and these are the chromaticities at the maximum scattering angle (plus side) and the minimum scattering angle (minus side) where the luminance becomes half the value in the beam profile.

It was confirmed that the chromaticity A of the comparative example deviated from the referential chromaticity Ref in the direction of increasing the blue component. It was confirmed that the chromaticity B of this embodiment was closer to the referential chromaticity Ref than the chromaticity A of the comparative example and the coloring could be suppressed.

Second Configuration Example

The second configuration example of this embodiment described below corresponds to an example in which the refractive index distribution of the liquid crystal layer is controlled by making the intervals between adjacent electrodes different.

Figure 12:
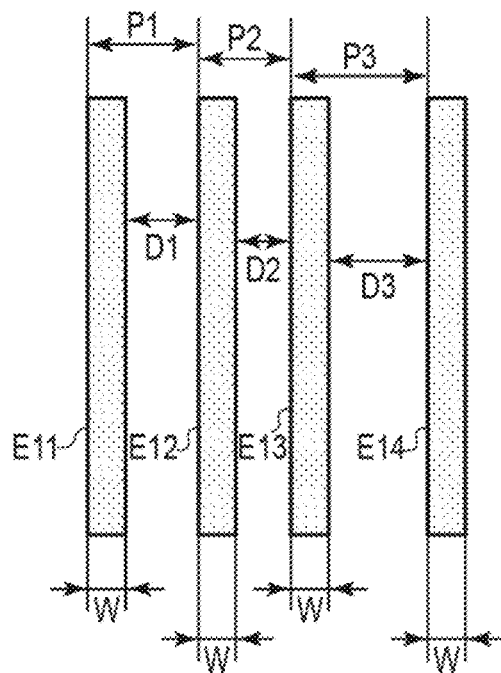
FIG. 12 is a plan view illustrating the second configuration example.

FIG. 12 is a plan view illustrating the second configuration example. The first electrode E11, the second electrode E12, the third electrode E13, and the fourth electrode E14 are disposed such that the intervals between the adjacent electrodes are different. In other words, an interval D1 between the first electrode E11 and the second electrode E12, an interval D2 between the second electrode E12 and the third electrode E13, and an interval D3 between the third electrode E13 and the fourth electrode E14 are different (D1≠D2≠D3). The potential difference aV between the first electrode E11 and the second electrode E12, the potential difference bV between the second electrode E12 and the third electrode E13, and the potential difference cV between the third electrode E13 and the fourth electrode E14 may be different from each other as described with respect to the first configuration example shown in FIG. 7 (a≠b≠c) or may be the same as each other (a=b=c).

A pitch P1 between the first electrode E11 and the second electrode E12, a pitch P2 between the second electrode E12 and the third electrode E13, and a pitch P3 between the third electrode E13 and the fourth electrode E14 are different from each other. In addition, an electrode width W1 of the first electrode E11, an electrode width W2 of the second electrode E12, an electrode width W3 of the third electrode E13, and an electrode width W4 of the fourth electrode E14 are the same as each other.

The electrode intervals in the first liquid crystal cell 10 have been described, and the electrode intervals in the second liquid crystal cell 20 are set similarly.

Thus, the electric fields formed between the adjacent electrodes are different since the intervals between the adjacent electrodes are different. For this reason, the refractive index distribution of the liquid crystal layer differs between the electrodes, and the peak of light intensity hardly appears at a specific position in each color component. In the second configuration example, too, the same advantages as those of the first configuration example can be therefore obtained.

Figure 13:
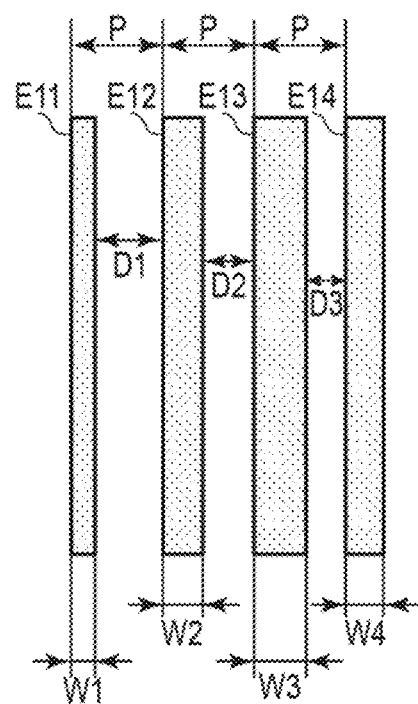
FIG. 13 is a plan view illustrating a variation of the second configuration example.

FIG. 13 is a plan view illustrating a variation of the second configuration example. In the example shown in FIG. 13, the electrode width W1 of the first electrode E11, the electrode width W2 of the second electrode E12, the electrode width W3 of the third electrode E13, and the electrode width W4 of the fourth electrode E14 are different from each other. In addition, a pitch P between the first electrode E11 and the second electrode E12, a pitch P between the second electrodes E12 and the third electrodes E13, and a pitch P between the third electrode E13 and the fourth electrode E14 are the same as each other. The intervals D1 to D3 are different from each other.

In this example, too, the same advantages as those described with reference to FIG. 12 can be obtained.

Figure 14:
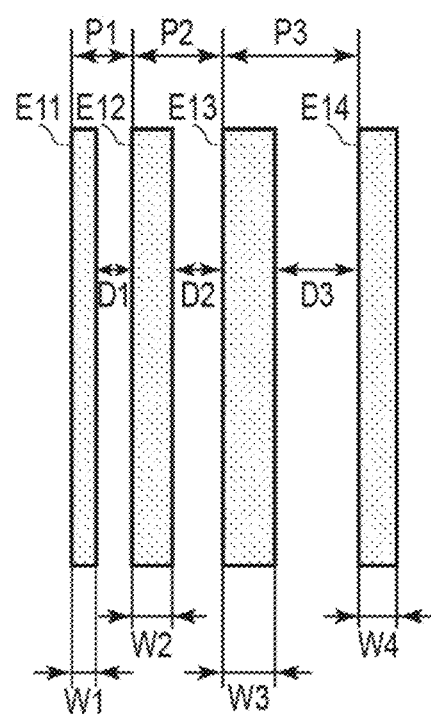
FIG. 14 is a plan view illustrating another variation of the second configuration example.

FIG. 14 is a plan view illustrating another variation of the second configuration example. In the example shown in FIG. 14, the electrode width W1 of the first electrode E11, the electrode width W2 of the second electrode E12, the electrode width W3 of the third electrode E13, and the electrode width W4 of the fourth electrode E14 are different from each other. In addition, the pitch P1 between the first electrode E11 and the second electrode E12, the pitch P2 between the second electrode E12 and the third electrode E13, and the pitch P3 between the third electrode E13 and the fourth electrode E14 are different from each other. The intervals D1 to D3 are different from each other.

In this example, too, the same advantages as those described with reference to FIG. 12 can be obtained.

Next, several variations applicable to the first configuration example and the second configuration example will be described. Illustration of the alignment film is omitted in the liquid crystal cells of the variations described below.

Figure 15A:
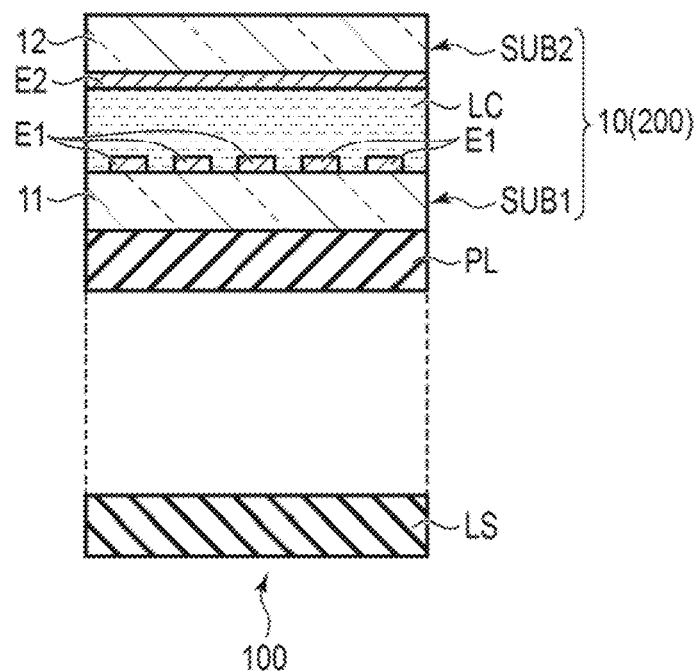
FIG. 15A is a view showing a variation of the illumination device 100.

In the variation shown in FIG. 15A, the illumination device 100 comprises one liquid crystal cell 10 as the light control device 200. In the liquid crystal cell 10, the first substrate SUB1 comprises a plurality of first transparent electrodes E1 on the insulating substrate 11, the second substrate SUB2 comprises the second transparent electrode E2 on the insulating substrate 12, and the liquid crystal layer LC is held between the first substrate SUB1 and the second substrate SUB2. The polarizer PL is bonded to the liquid crystal cell 10 and, in the example illustrated, bonded to the side of the insulating substrate 11 which is opposed to the light source LS.

In such a variation, the first polarization component of the light emitted from the light source LS is scattered in the liquid crystal cell 10, and the second polarization component is absorbed by the polarizing plate PL or reflected to the light source LS side.

Figure 15B:
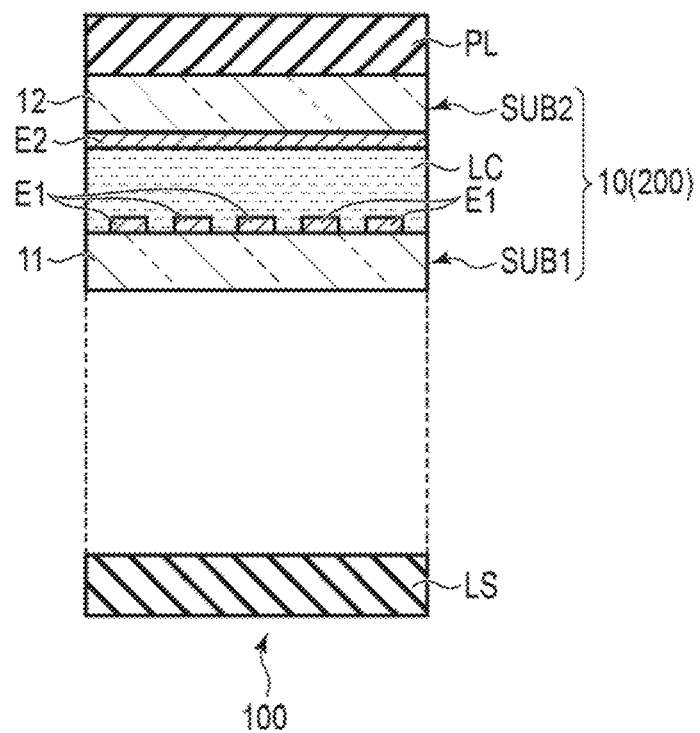
FIG. 15B is a view showing a variation of the illumination device 100.

The variation of the illumination device 100 shown in FIG. 15B is different from the variation shown in FIG. 15A in that the polarizer PL is bonded to a side of the insulating substrate 12 which is opposed to the liquid crystal layer LC.

Figure 15C:
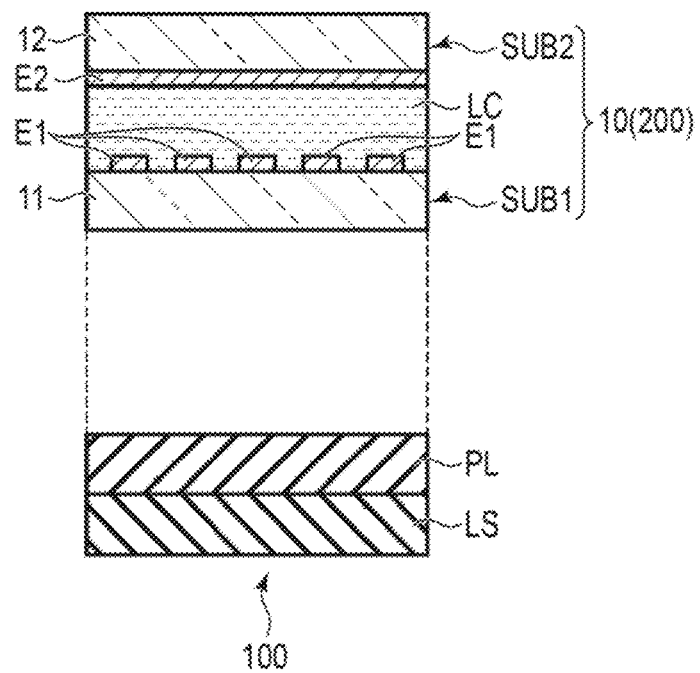
FIG. 15C is a view showing a variation of the illumination device 100.

The variation of the illumination device 100 shown in FIG. 15C is different from the variation shown in FIG. 15A in that the polarizer PL is disposed on a side of the light source LS which is opposed to the insulating substrate 11.

In each of the variations shown in FIG. 15A to FIG. 15C, the liquid crystal layer LC may contain twist-aligned liquid crystal molecules, horizontally aligned liquid crystal molecules, or vertically aligned liquid crystal molecules.

Figure 16:
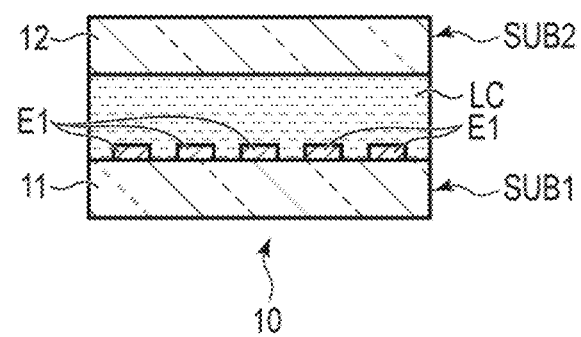
FIG. 16 is a view showing a variation of a liquid crystal cell 10.

FIG. 16 is a view showing a variation of a liquid crystal cell 10.

The first substrate SUB1 comprises a plurality of first transparent electrodes E1 while the second substrate SUB2 does not comprise a second transparent electrode. In such a variation, different voltages are applied to the adjacent first transparent electrodes E1.

Figure 17A:
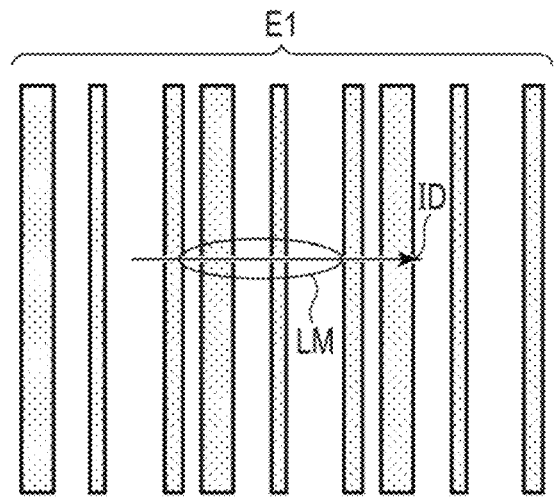
FIG. 17A is a view showing a variation of a first transparent electrode E1.

In a variation shown in FIG. 17A, each of a plurality of first transparent electrodes E1 is formed in a strip shape extending in one direction. The initial alignment direction ID of the liquid crystal molecules LM is substantially orthogonal to the extending direction of the first transparent electrodes E1. The light transmitted through the first transparent electrodes E1 is scattered to extend in the direction orthogonal to the first transparent electrodes E1.

Figure 17B:
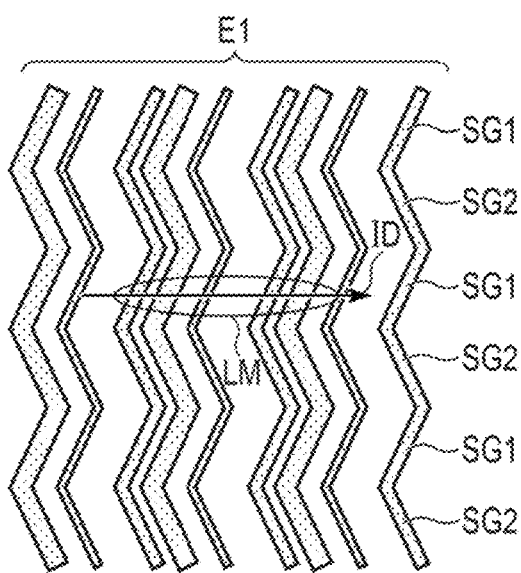
FIG. 17B is a view showing a variation of the first transparent electrode E1.

In a variation shown in FIG. 17B, each of the first transparent electrodes E1 is bent. In other words, the first transparent electrode E1 includes two segments SG1 and SG2 extending in different directions from each other. The initial alignment direction ID of the liquid crystal molecules LM intersects both the segment SG1 and the segment SG2. The light transmitted through the first transparent electrodes E1 is scattered to extend in the direction orthogonal to the segment SG1 and the direction orthogonal to the segment SG2.

The first transparent electrodes E1 may include first transparent electrodes E1 different in width as described above. In addition, the intervals between the adjacent first transparent electrodes E1 may be different or the potential differences of the adjacent first transparent electrodes E1 may be different.

Figure 18C:
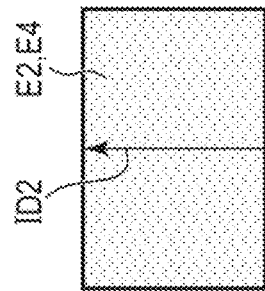
FIG. 18C is a view showing a variation of the illumination device 100.
Figure 18B:
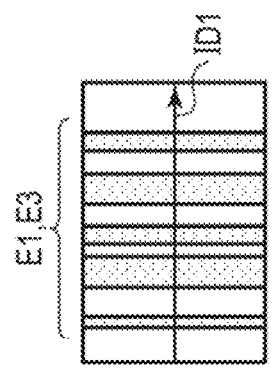
FIG. 18B is a view showing a variation of the illumination device 100.
Figure 18A:
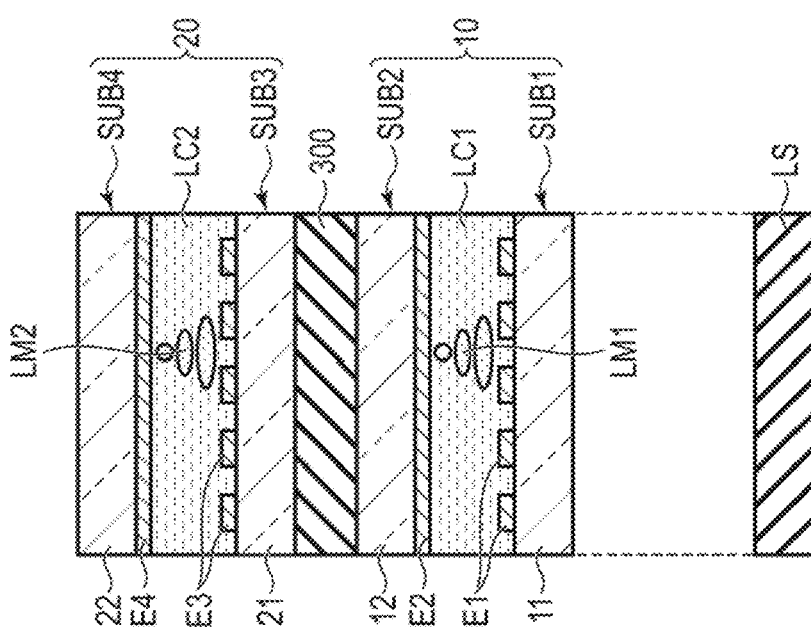
FIG. 18A is a view showing a variation of the illumination device 100.

FIG. 18A to FIG. 18C are views showing variations of the illumination device 100.

As shown in FIG. 18A, the illumination device 100 comprises the light source LS, the first liquid crystal cell 10, the second liquid crystal cell 20, and a transparent resin layer 300. The resin layer 300 sticks the insulating substrate 12 of the first liquid crystal cell 10 to the insulating substrate 21 of the second liquid crystal cell 20. A refractive index of the resin layer 300 is equal to the refractive indexes of the insulating substrates 12 and 21. The liquid crystal molecules LM1 in the first liquid crystal layer LC1 are twist-aligned between the first substrate SUB1 and the second substrate SUB2. The liquid crystal molecules LM2 in the second liquid crystal layer LC2 are twist-aligned between the third substrate SUB3 and the fourth substrate SUB4. The first substrate SUB1 comprises a plurality of first transparent electrodes E1, the second substrate SUB2 comprises a second transparent electrode E2, the third substrate SUB3 comprises a plurality of third transparent electrodes E3, and the fourth substrate SUB4 comprises a fourth transparent electrode E4.

As shown in FIG. 18B, the first transparent electrodes E1 and the third transparent electrodes E3 are formed in a strip shape extending in one direction. The initial alignment direction ID1 of the liquid crystal molecules in the vicinity of the first transparent electrodes E1 and the third transparent electrodes E3 is substantially orthogonal to the extending direction of the electrodes.

As shown in FIG. 18C, the second transparent electrode E2 and the fourth transparent electrode E4 are formed in a flat plate shape. The initial alignment direction ID2 of the liquid crystal molecules in the vicinity of the second transparent electrode E2 and the fourth transparent electrode E4 is substantially orthogonal to the initial alignment direction ID1.

For example, the first polarization component, of the light emitted from the light source LS, is scattered in the first liquid crystal cell 10 to extend in a direction orthogonal to the first transparent electrodes E1, and the second polarization component is converted into the first polarization component in the process of transmitting through the first liquid crystal cell 10. The first polarization component converted in the first liquid crystal cell 10 is scattered to extend in a direction orthogonal to the third transparent electrodes E3 in the second liquid crystal cell 20.

Figure 19A:
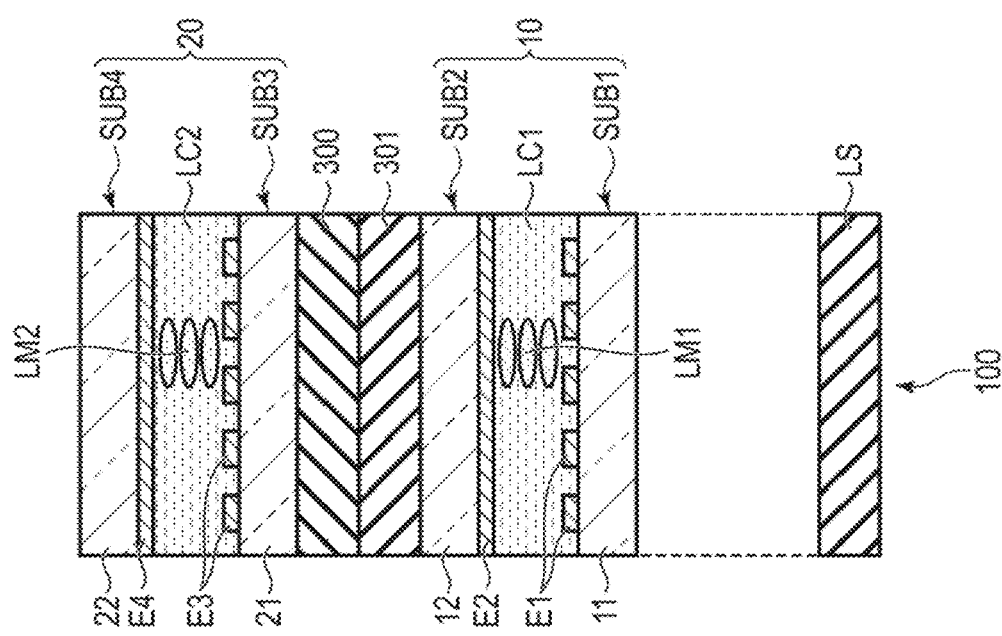
FIG. 19A is a view showing a variation of the illumination device 100.
Figure 19B:
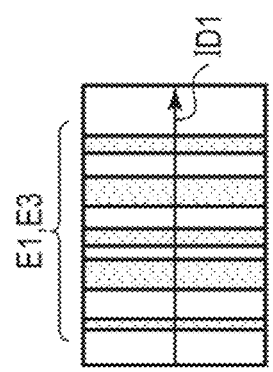
FIG. 19B is a view showing a variation of the illumination device 100.
Figure 19C:
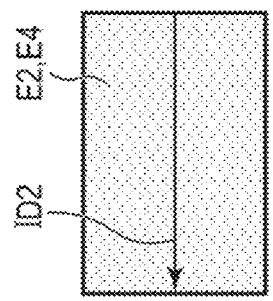
FIG. 19C is a view showing a variation of the illumination device 100.

FIG. 19A to FIG. 19C are views showing variations of the illumination device 100.

As shown in FIG. 19A, the illumination device 100 comprises the light source LS, the first liquid crystal cell 10, the second liquid crystal cell 20, the transparent resin layer 300, and a retardation film 301. The retardation film 301 rotates the polarization axis of linearly polarized light from the first liquid crystal cell 10 to the second liquid crystal cell 20. For example, the retardation film 301 is configured to impart a phase difference of a half wavelength to the linearly polarized light which is transmitted through the own film. The retardation film 301 may be a single optical sheet or a multilayered optical sheet.

The liquid crystal molecules LM1 in the first liquid crystal layer LC1 are horizontally aligned between the first substrate SUB1 and the second substrate SUB2. The liquid crystal molecules LM2 in the second liquid crystal layer LC2 are horizontally aligned between the third substrate SUB3 and the fourth substrate SUB4.

As shown in FIG. 19B, the initial alignment direction ID1 of the liquid crystal molecules in the vicinity of the first transparent electrodes E1 and the third transparent electrodes E3 is substantially orthogonal to the extending direction of the electrodes.

As shown in FIG. 19C, the initial alignment direction ID2 of the liquid crystal molecules in the vicinity of the second transparent electrode E2 and the fourth transparent electrode E4 is substantially parallel to the initial alignment direction ID1.

For example, the first polarization component, of the light emitted from the light source LS, is scattered in the first liquid crystal cell 10 to extend in the direction orthogonal to the first transparent electrodes E1. The second polarization component that has transmitted through the first liquid crystal cell 10 is converted into the first polarization component in the process of transmitting through the retardation film 301. The first polarization component converted in the retardation film 301 is scattered to extend in the direction orthogonal to the third transparent electrode E3 in the second liquid crystal cell 20.

Figure 20B:
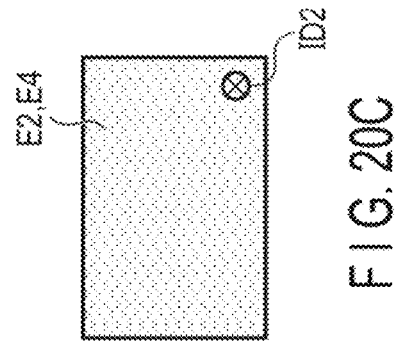
FIG. 20B is a view showing a variation of the illumination device 100.
Figure 20C:
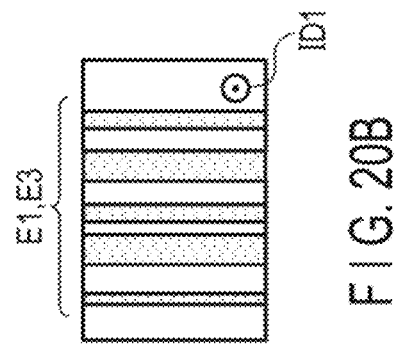
FIG. 20C is a view showing a variation of the illumination device 100.
Figure 20A:
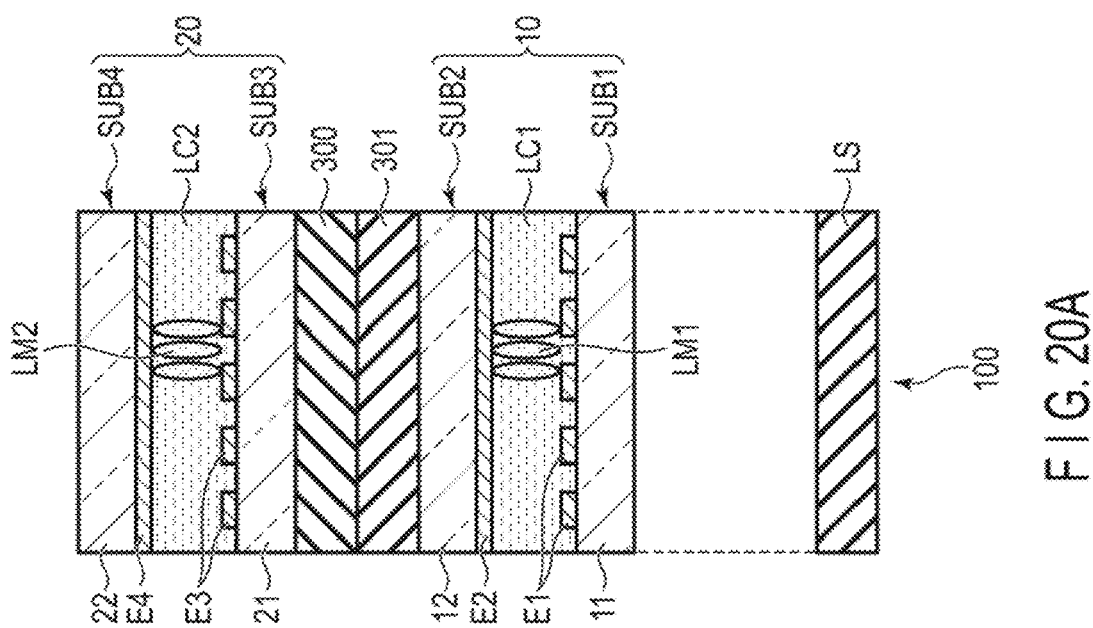
FIG. 20A is a view showing a variation of the illumination device 100.

FIG. 20A to FIG. 20C are views showing variations of the illumination device 100. The variations shown in FIG. 20A to FIG. 20C are different from the variations shown in FIG. 19A to FIG. 19C in the initial alignment directions of the liquid crystal molecules LM1 and LM2.

As shown in FIG. 20A, the liquid crystal molecules LM1 in the first liquid crystal layer LC1 are vertically aligned between the first substrate SUB1 and the second substrate SUB2. The liquid crystal molecules LM2 in the second liquid crystal layer LC2 are vertically aligned between the third substrate SUB3 and the fourth substrate SUB4.

As shown in FIG. 20B, the initial alignment direction ID1 of the liquid crystal molecules in the vicinity of the first transparent electrodes E1 and the third transparent electrodes E3 is substantially parallel to the normal of the electrodes.

As shown in FIG. 20C, the initial alignment direction ID2 of the liquid crystal molecules in the vicinity of the second transparent electrode E2 and the fourth transparent electrode E4 is substantially parallel to the initial alignment direction ID1 and substantially parallel to the normal of the electrodes.

Even in the variations, the light emitted from the light source LS is scattered similarly to the variations described with reference to FIG. 19A to FIG. 19C.

In each of the variations shown in FIG. 18A to 18C, FIG. 19A to FIG. 19C, and FIG. 20A to FIG. 20C, the first transparent electrodes E1 and the third transparent electrodes E3 may not have the same structure, and the applied voltages of the first transparent electrodes E1 may be different from the applied voltages of the third transparent electrodes E3. Several variations will be described below.

FIG. 21A to FIG. 21D are views showing variations of the first transparent electrodes E1 and the third transparent electrodes E3.

Figure 21A:
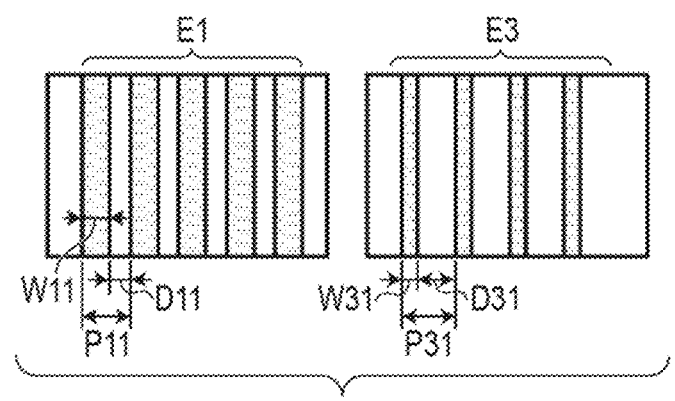
FIG. 21A is a view showing a variation of the first transparent electrode E1 and the third transparent electrode E3.

In the variation shown in FIG. 21A, the width W11 of the first transparent electrode E1 is different from the width W31 of the third transparent electrode E3. In addition, an interval D11 between the adjacent first transparent electrodes E1 is different from an interval D31 between the adjacent third transparent electrodes E3. In addition, a pitch P11 between the adjacent first transparent electrodes E1 is different from a pitch P31 between the adjacent third transparent electrodes E3.

Figure 21B:
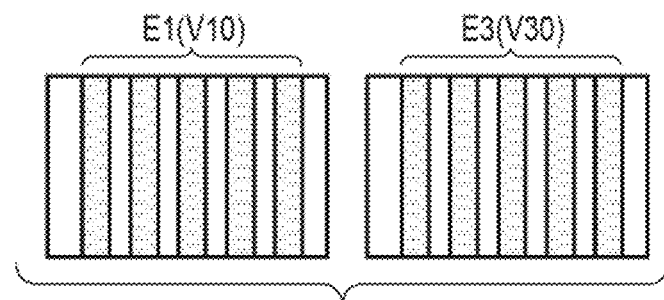
FIG. 21B is a view showing a variation of the first transparent electrode E1 and the third transparent electrode E3.

In the variation shown in FIG. 21B, a voltage V10 applied to the first transparent electrodes E1 is different from a voltage V30 applied to the third transparent electrodes E3.

Figure 21C:
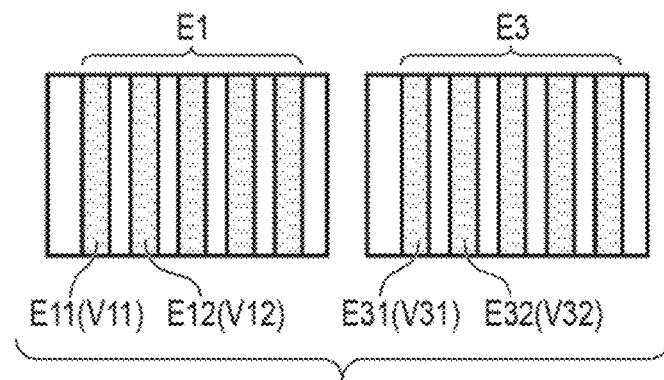
FIG. 21C is a view showing a variation of the first transparent electrode E1 and the third transparent electrode E3.

In the variation shown in FIG. 21C, each of voltages applied to the first transparent electrodes E1 is different from each of voltages applied to the third transparent electrodes E3. For example, an applied voltage V11 of the electrode E11 and an applied voltage V12 of the electrode E12, in the first transparent electrodes E1, are different from an applied voltage V3l of the electrode E31 and an applied voltage V32 of the electrode E32, in the third transparent electrodes E3. In addition, the potential difference between the electrode E11 and the electrode E12 is different from the potential difference between the electrode E31 and the electrode E32.

Figure 21D:
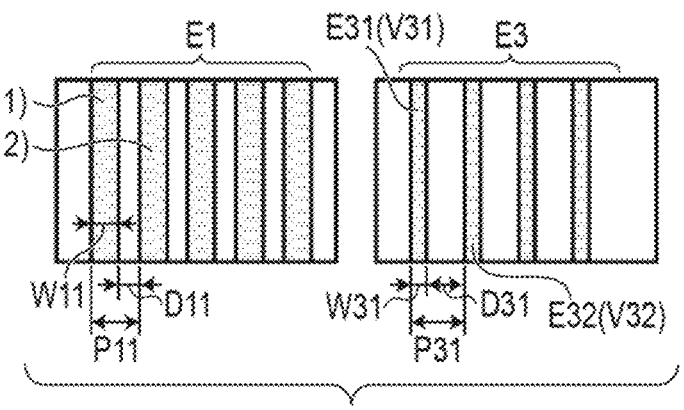
FIG. 21D is a view showing a variation of the first transparent electrode E1 and the third transparent electrode E3.

In the variation shown in FIG. 21D, the width W11 is different from the width W31, the interval D11 is different from the interval D31, and the pitch P11 is different from the pitch P31. In addition, the applied voltages V11 and V12 are different from the applied voltages V3l and V32, and the potential difference between the electrode E11 and the electrode E12 is different from the potential difference between the electrode E31 and the electrode E32.

Next, several variations of the combination of the shapes of the pair of electrodes opposed to each other across the liquid crystal layer in one liquid crystal cell will be described. For example, the first transparent electrodes E1 shown in FIG. 18A to FIG. 18C are formed in a strip shape and the second transparent electrode E2 is shaped in a flat plate shape, but the shapes are not limited to this combination.

Figure 22A:
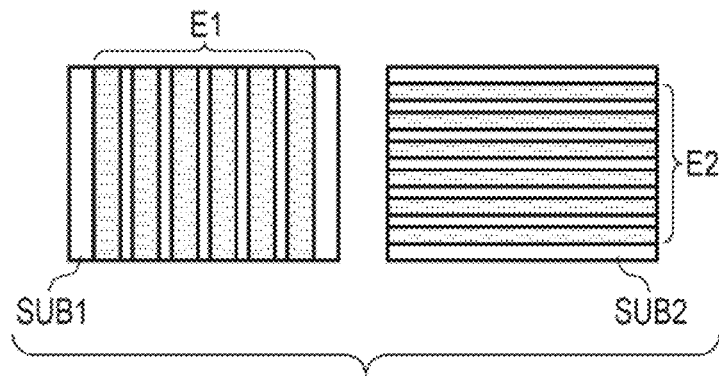
FIG. 22A is a view showing a variation of the first transparent electrode E1 and the second transparent electrode E2.
Figure 22B:
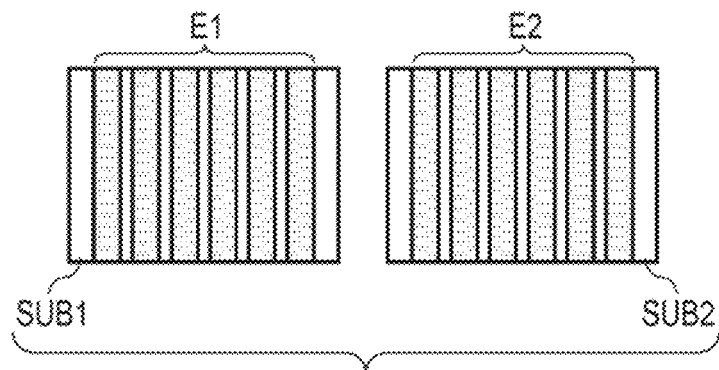
FIG. 22B is a view showing a variation of the first transparent electrode E1 and the second transparent electrode E2.
Figure 22C:
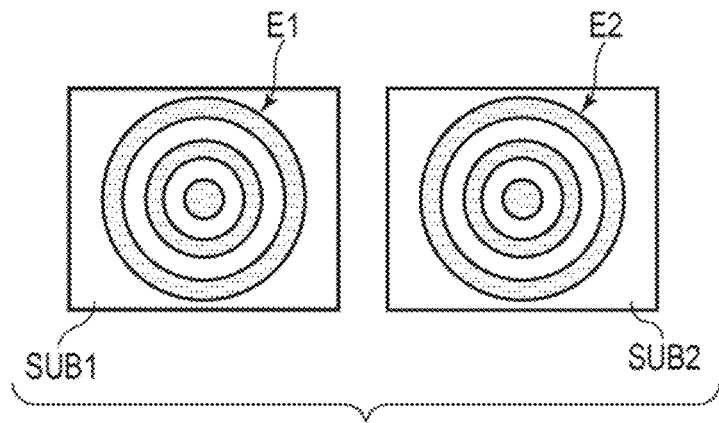
FIG. 22C is a view showing a variation of the first transparent electrode E1 and the second transparent electrode E2.

FIG. 22A to FIG. 22C are views showing variations of the first transparent electrodes E1 and the second transparent electrodes E2.

In the variation shown in FIG. 22A, the first transparent electrodes E1 and the second transparent electrodes E2 are formed in a strip shape to intersect (or to be substantially orthogonal to each other).

In the variation shown in FIG. 22B, the first transparent electrodes E1 and the second transparent electrodes E2 are shaped in a strip shape to substantially parallel to each other.

As shown in FIG. 22C, each of the first transparent electrode E1 and the second transparent electrode E2 is formed in an annular shape. When the first transparent electrode E1 is formed in an annular shape, the first substrate SUB1 may be formed in a circular shape according to the outer shape of the first transparent electrode E1. The second substrate SUB2 may also be formed in a circular shape.

In the illumination device 100, three or more liquid crystal cells may be stacked.

Figure 23:
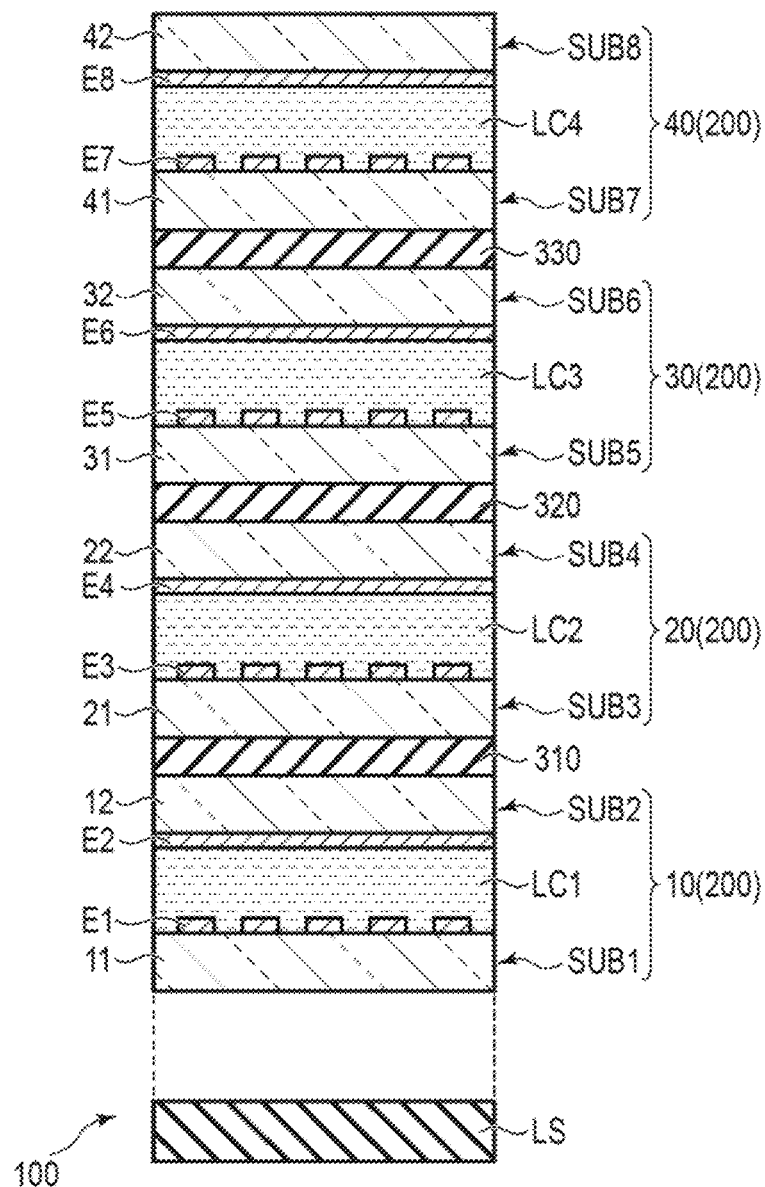
FIG. 23 is a view showing a variation of the illumination device 100.

FIG. 23 is a view showing a variation of the illumination device 100. In the example illustrated, the illumination device 100 comprises four liquid crystal cells as the light control devices 200. In other words, the illumination device 100 comprises the light source LS, the first liquid crystal cell 10, the second liquid crystal cell 20, the third liquid crystal cell 30, and a fourth liquid crystal cell 40. A transparent resin layer 310 sticks the insulating substrate 12 of the first liquid crystal cell 10 to the insulating substrate 21 of the second liquid crystal cell 20. A transparent resin layer 320 sticks the insulating substrate 22 of the second liquid crystal cell 20 to the insulating substrate 31 of the third liquid crystal cell 30. A transparent resin layer 330 sticks the insulating substrate 32 of the third liquid crystal cell 30 to an insulating substrate 41 of the fourth liquid crystal cell 40. Each of the resin layers 310, 320, and 330 may include a retardation film having the same function as the retardation film 301. The first liquid crystal cell 10 comprises a plurality of first transparent electrodes E1 and the second transparent electrode E2. The second liquid crystal cell 20 comprises a plurality of third transparent electrodes E3 and the fourth transparent electrode E4. The third liquid crystal cell 30 comprises a plurality of fifth transparent electrodes E5 and a sixth transparent electrode E6. The fourth liquid crystal cell 40 comprises a plurality of seventh transparent electrodes E7 and an eighth transparent electrode E8. The second transparent electrode E2, the fourth transparent electrode E4, the sixth transparent electrode E6, and the eighth transparent electrode E8 may be omitted. As regards the plurality of first transparent electrodes E1, the plurality of third transparent electrodes E3, the plurality of fifth transparent electrodes E5, and the plurality of seventh transparent electrodes E7, the electrode shape, the electrode extending direction, the electrode width, the electrode pitch, the electrode interval, the applied voltage, the potential difference, and the like may be the same or different. The initial alignment directions of the liquid crystal molecules contained in each of the first liquid crystal layer LC1, the second liquid crystal layer LC2, the third liquid crystal layer LC3, and the fourth liquid crystal layer LC4 may be the same or different.

As described above, according to this embodiment, a light control device and an illumination device capable of suppressing coloring can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A light control device comprising, in a liquid crystal cell comprising a liquid crystal layer between a pair of substrates:
    an insulating substrate; and
    first to fourth electrodes arranged in order on the insulating substrate and formed in a strip shape,
    wherein an interval between the first electrode and the second electrode, an interval between the second electrode and the third electrode, and an interval between the third electrode and the fourth electrode are different from each other,
    widths of the respective first to fourth electrodes are different from each other, and
    a pitch between the first electrode and the second electrode, a pitch between the second electrode and the third electrode, and a pitch between the third electrode and the fourth electrode are equal to each other.

2. A light control device comprising:
    a first liquid crystal cell comprising a first liquid crystal layer between a pair of substrates;
    a second liquid crystal cell comprising a second liquid crystal layer between a pair of substrates; and
    a polarization conversion element disposed between the first liquid crystal cell and the second liquid crystal cell, wherein one of substrates in each of the first liquid crystal cell and the second liquid crystal cell, comprising:
an insulating substrate; and
first to fourth electrodes arranged in order on the insulating substrate and formed in a strip shape,
a potential difference between the first electrode and the second electrode, a potential difference between the second electrode and the third electrode, and a potential difference between the third electrode and the fourth electrode are different from each other,
the first liquid crystal cell is configured to scatter a first polarization component having a polarization plane in a first direction, of incident light,
the polarization conversion element is configured to convert a second polarization component having a polarization plane in a second direction intersecting the first direction, of light transmitting through the first liquid crystal cell, into the first polarization component, and
the second liquid crystal cell is configured to scatter the first polarization component, of the light transmitting through the polarization conversion element.

3. The light control device of claim 2, wherein
an applied voltage of the first electrode and an applied voltage of the third electrode are positive, and
an applied voltage of the second electrode and an applied voltage of the fourth electrode are negative.

4. The light control device of claim 3, wherein
absolute values of the respective applied voltages of the first electrode and the second electrode are equal to each other, and
absolute values of the respective applied voltages of the third electrode and the fourth electrode are equal to each other.

5. The light control device of claim 2, wherein
the polarization conversion element comprises a third liquid crystal layer between a pair of substrates, and
the third liquid crystal layer contains twist-aligned liquid crystal molecules.

6. A light control device comprising:
a first liquid crystal cell comprising a first liquid crystal layer between a pair of substrates;
a second liquid crystal cell comprising a second liquid crystal layer between the pair of substrates; and
a polarization conversion element disposed between the first liquid crystal cell and the second liquid crystal cell,
wherein one of substrates in each of the first liquid crystal cell and the second liquid crystal cell comprising:
an insulating substrate; and
first to fourth electrodes arranged in order on the insulating substrate and formed in a strip shape,
an interval between the first electrode and the second electrode, an interval between the second electrode and the third electrode, and an interval between the third electrode and the fourth electrode are different from each other,
the first liquid crystal cell is configured to scatter a first polarization component having a polarization plane in a first direction, of incident light,
the polarization conversion element is configured to convert a second polarization component having a polarization plane in a second direction intersecting the first direction, of light transmitting through the first liquid crystal cell, into the first polarization component, and
the second liquid crystal cell is configured to scatter the first polarization component, of the light transmitting through the polarization conversion element.

7. The light control device of claim 6, wherein
a pitch between the first electrode and the second electrode, a pitch between the second electrode and the third electrode, and a pitch between the third electrode and the fourth electrode are different from each other, and
widths of the respective first to fourth electrodes are equal to each other.

8. The light control device of claim 6, wherein
widths of the respective first to fourth electrodes are different from each other, and
a pitch between the first electrode and the second electrode, a pitch between the second electrode and the third electrode, and a pitch between the third electrode and the fourth electrode are equal to each other.

9. The light control device of claim 6, wherein
a pitch between the first electrode and the second electrode, a pitch between the second electrode and the third electrode, and a pitch between the third electrode and the fourth electrode are different from each other, and
widths of the respective first to fourth electrodes are different from each other.

10. The light control device of claim 6, wherein
the polarization conversion element comprises a third liquid crystal layer between a pair of substrates, and
the third liquid crystal layer contains twist-aligned liquid crystal molecules.

* * * * *